United States Patent
Taamazyan et al.

(10) Patent No.: US 11,954,886 B2
(45) Date of Patent: Apr. 9, 2024

(54) SYSTEMS AND METHODS FOR SIX-DEGREE OF FREEDOM POSE ESTIMATION OF DEFORMABLE OBJECTS

(71) Applicant: INTRINSIC INNOVATION LLC, Mountain View, CA (US)

(72) Inventors: Vage Taamazyan, Moscow (RU); Agastya Kalra, Nepean (CA); Kartik Venkataraman, San Jose, CA (US); Achuta Kadambi, Los Altos Hills, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 126 days.

(21) Appl. No.: 17/232,084

(22) Filed: Apr. 15, 2021

(65) Prior Publication Data
US 2022/0343537 A1    Oct. 27, 2022

(51) Int. Cl.
*G06T 7/73* (2017.01)
*G06F 18/214* (2023.01)
*G06V 10/40* (2022.01)

(52) U.S. Cl.
CPC .............. *G06T 7/75* (2017.01); *G06F 18/214* (2023.01); *G06V 10/40* (2022.01); *G06T 2207/20081* (2013.01); *G06T 2207/20084* (2013.01)

(58) Field of Classification Search
CPC ............ G06T 7/75; G06T 2207/20081; G06T 2207/20084; G06F 18/214; G06V 10/40; G06V 10/143; G06V 10/147; G06V 10/16; G06V 10/74; G06V 20/647; G06V 2201/06; G06V 10/774; G06V 10/82
See application file for complete search history.

(56) References Cited

U.S. PATENT DOCUMENTS

| | | |
|---|---|---|
| 4,124,798 A | 11/1978 | Thompson |
| 4,198,646 A | 4/1980 | Alexander et al. |
| 4,323,925 A | 4/1982 | Abell et al. |
| 4,460,449 A | 7/1984 | Montalbano |
| 4,467,365 A | 8/1984 | Murayama et al. |

(Continued)

FOREIGN PATENT DOCUMENTS

| | | |
|---|---|---|
| CN | 2488005 Y | 4/2002 |
| CN | 1619358 A | 5/2005 |

(Continued)

OTHER PUBLICATIONS

US 8,957,977 B2, 02/2015, Venkataraman et al. (withdrawn)
(Continued)

*Primary Examiner* — Wesley J Tucker
(74) *Attorney, Agent, or Firm* — Fish & Richardson P.C.

(57) ABSTRACT

A method for estimating a pose of a deformable object includes: receiving, by a processor, a plurality of images depicting the deformable object from multiple viewpoints; computing, by the processor, one or more object-level correspondences and a class of the deformable object depicted in the images; loading, by the processor, a 3-D model corresponding to the class of the deformable object; aligning, by the processor, the 3-D model to the deformable object depicted in the plurality of images to compute a six-degree of freedom (6-DoF) pose of the object; and outputting, by the processor, the 3-D model and the 6-DoF pose of the object.

42 Claims, 15 Drawing Sheets

(56) References Cited

U.S. PATENT DOCUMENTS

| | | |
|---|---|---|
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |

(56) References Cited

U.S. PATENT DOCUMENTS

| | | |
|---|---|---|
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,154,773 B2 | 10/2015 | Ding et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Duparre |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |

(56) References Cited

U.S. PATENT DOCUMENTS

| | | |
|---|---|---|
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |

(56) References Cited

U.S. PATENT DOCUMENTS

| | | |
|---|---|---|
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0285755 A1* | 12/2006 | Hager .................. G06V 20/653 382/224 |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |

(56) References Cited

U.S. PATENT DOCUMENTS

| | | |
|---|---|---|
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |

(56) References Cited

U.S. PATENT DOCUMENTS

| | | |
|---|---|---|
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043603 A1* | 2/2011 | Schechner ............ G06T 5/003 348/E5.062 |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0306413 A1* | 12/2011 | Bickerstaff ............ A63F 13/533 463/31 |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |

(56) References Cited

U.S. PATENT DOCUMENTS

| | | |
|---|---|---|
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |

(56) References Cited

U.S. PATENT DOCUMENTS

| | | |
|---|---|---|
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0189767 A1 | 7/2018 | Bigioi |
| 2018/0197035 A1 | 7/2018 | Venkataraman et al. |

(56) References Cited

U.S. PATENT DOCUMENTS

| | | | |
|---|---|---|---|
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0268586 A1 | 8/2019 | Mullis |
| 2019/0289176 A1 | 9/2019 | Duparre |
| 2019/0333267 A1* | 10/2019 | Black .................. G06F 18/2321 |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |
| 2020/0151894 A1 | 5/2020 | Jain et al. |
| 2020/0226786 A1* | 7/2020 | Fitzgibbon .............. G06T 7/251 |
| 2020/0252597 A1 | 8/2020 | Mullis |
| 2020/0334905 A1 | 10/2020 | Venkataraman |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0133927 A1 | 5/2021 | Lelescu et al. |
| 2021/0150748 A1 | 5/2021 | Ciurea et al. |
| 2022/0375125 A1* | 11/2022 | Taamazyan .............. G06T 7/269 |
| 2022/0405506 A1* | 12/2022 | Taamazyan ................ G06T 7/50 |
| 2023/0070008 A1* | 3/2023 | Kulon ...................... G06T 3/40 |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 104685513 B | 4/2018 |
| CN | 107924572 A | 4/2018 |
| CN | 108307675 A | 7/2018 |
| CN | 104335246 B | 9/2018 |
| CN | 107404609 B | 2/2020 |
| CN | 107346061 B | 4/2020 |
| CN | 107230236 B | 12/2020 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 3328048 A1 | 5/2018 |
| EP | 3075140 B1 | 6/2018 |
| EP | 3201877 B1 | 12/2018 |
| EP | 3467776 A1 | 4/2019 |
| EP | 2708019 B1 | 10/2019 |
| EP | 3286914 B1 | 12/2019 |
| EP | 2761534 B1 | 11/2020 |
| EP | 2888720 B1 | 3/2021 |
| EP | 3328048 B1 | 4/2021 |
| GB | 2482022 A | 1/2012 |
| IN | 2708/CHENP/2014 | 8/2015 |
| IN | 361194 | 3/2021 |
| JP | 59-025483 | 2/1984 |
| JP | 64-037177 | 2/1989 |
| JP | 02-285772 A | 11/1990 |

(56) References Cited

FOREIGN PATENT DOCUMENTS

| | | |
|---|---|---|
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 2019-220957 A | 12/2019 |
| JP | 6630891 B2 | 12/2019 |
| JP | 2020017999 A | 1/2020 |
| JP | 6767543 B2 | 9/2020 |
| JP | 6767558 B2 | 9/2020 |
| KR | 1020050004239 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| KR | 101973822 B1 | 4/2019 |
| KR | 10-2002165 B1 | 7/2019 |
| KR | 10-2111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |

(56) References Cited

FOREIGN PATENT DOCUMENTS

| WO | 2014164909 | A1 | 10/2014 |
|---|---|---|---|
| WO | 2014165244 | A1 | 10/2014 |
| WO | 2014133974 | A9 | 4/2015 |
| WO | 2015048694 | A2 | 4/2015 |
| WO | 2015048906 | A1 | 4/2015 |
| WO | 2015070105 | A1 | 5/2015 |
| WO | 2015074078 | A1 | 5/2015 |
| WO | 2015081279 | A1 | 6/2015 |
| WO | 2015134996 | A1 | 9/2015 |
| WO | 2015183824 | A1 | 12/2015 |
| WO | 2016054089 | A1 | 4/2016 |
| WO | 2016/172125 | | 10/2016 |
| WO | 2016167814 | A1 | 10/2016 |
| WO | 2016172125 | A9 | 4/2017 |
| WO | 2018053181 | A1 | 3/2018 |
| WO | 2019038193 | A1 | 2/2019 |

OTHER PUBLICATIONS

Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for The Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.

Borman et al, "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound eyes", Optics Express, Nov. 22, 2010, vol. 18, No. 24, pp. 24379-24394.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bryan et al., "Perspective Distortion from Interpersonal Distance Is an Implicit Visual Cue for Social Judgments of Faces", PLoS One, vol. 7, Issue 9, Sep. 26, 2012, e45301, doi:10.1371/journal.pone. 0045301, 9 pgs.
Bulat et al., "How far are we from solving the 2D & 3D Face Alignment problem? (and a dataset of 230,000 3D facial landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-resolution", Retrieved on Nov. 10, 2012, Retrieved from the Internet at URL:<http://citeseerx.ist. psu.edu/viewdoc/download?doi=10.1.1.226.2643&rep=rep1 &type= pdf>, 2001, 269 pgs.
Caron et al., "Multiple camera types simultaneous stereo calibration, Robotics and Automation (ICRA)", 2011 IEEE International Conference On, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging system", Multidim. Syst. Sign. Process, published online Feb. 23, 2007, vol. 18, pp. 83-101.
Chen et al., "Interactive deformation of light fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors" CVPR '13 Proceedings of the 2013 IEEE Conference on Computer Vision and Pattern Recognition, Jun. 23, 2013, pp. 1902-1907.

(56) References Cited

OTHER PUBLICATIONS

Chen et al., "Human Face Modeling and Recognition Through Multi-View High Resolution Stereopsis", IEEE Conference on Computer Vision and Pattern Recognition Workshop, Jun. 17-22, 2006, 6 pgs.

Collins et al., "An Active Camera System for Acquiring Multi-View Video", IEEE 2002 International Conference on Image Processing, Date of Conference: Sep. 22-25, 2002, Rochester, NY, 4 pgs.

Cooper et al., "The perceptual basis of common photographic practice", Journal of Vision, vol. 12, No. 5, Article 8, May 25, 2012, pp. 1-14.

Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.

Dainese et al., "Accurate Depth-Map Estimation For 3D Face Modeling", IEEE European Signal Processing Conference, Sep. 4-8, 2005, 4 pgs.

Debevec et al., "Recovering High Dynamic Range Radiance Maps from Photographs", Computer Graphics (ACM SIGGRAPH Proceedings), Aug. 16, 1997, 10 pgs.

Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.

Do et al., Immersive Visual Communication, IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.

Dou et al., "End-to-end 3D face reconstruction with deep neural networks" arXiv:1704.05020v1, Apr. 17, 2017, 10 pgs.

Drouin et al., "Improving Border Localization of Multi-Baseline Stereo Using Border-Cut", International Journal of Computer Vision, Jul. 5, 2006, vol. 83, Issue 3, 8 pgs.

Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.

Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.

Drulea et al., "Motion Estimation Using the Correlation Transform", IEEE Transactions on Image Processing, Aug. 2013, vol. 22, No. 8, pp. 3260-3270, first published May 14, 2013.

Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.

Duparre et al., Novel Optics/Micro-Optics for Miniature Imaging Systems, Proc. of SPIE, Apr. 21, 2006, vol. 6196, pp. 619607-1-619607-15.

Duparre et al., "Micro-optical artificial compound eyes", Bioinspiration & Biomimetics, Apr. 6, 2006, vol. 1, pp. R1-R16.

Duparre et al., "Artificial compound eye zoom camera", Bioinspiration & Biomimetics, Nov. 21, 2008, vol. 3, pp. 1-6.

Duparre et al., "Artificial apposition compound eye fabricated by micro-optics technology", Applied Optics, Aug. 1, 2004, vol. 43, No. 22, pp. 4303-4310.

Duparre et al., "Micro-optically fabricated artificial apposition compound eye", Electronic Imaging—Science and Technology, Prod. SPIE 5301, Jan. 2004, pp. 25-33.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Artificial compound eyes—different concepts and their application to ultra flat image acquisition sensors", MOEMS and Miniaturized Systems IV, Proc. SPIE 5346, Jan. 24, 2004, pp. 89-100.

Duparre et al., "Ultra-Thin Camera Based on Artificial Apposition Compound Eyes", 10th Microoptics Conference, Sep. 1-3, 2004, 2 pgs.

Duparre et al., "Microoptical telescope compound eye", Optics Express, Feb. 7, 2005, vol. 13, No. 3, pp. 889-903.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 2005, vol. 44, No. 15, pp. 2949-2956.

Duparre et al., "Microoptical Artificial Compound Eyes—Two Different Concepts for Compact Imaging Systems", 11th Microoptics Conference, Oct. 30-Nov. 2, 2005, 2 pgs.

Eng et al., "Gaze correction for 3D tele-immersive communication system", IVMSP Workshop, 2013 IEEE 11th. IEEE, Jun. 10, 2013.

Fanaswala, "Regularized Super-Resolution of Multi-View Images", Retrieved on Nov. 10, 2012 (Nov. 10, 2012). Retrieved from the Internet at URL:< http://www.site.uottawa.ca/-edubois/theses/Fanaswala_thesis.pdf>, 2009, 163 pgs.

Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.

Fangmin et al., "3D Face Reconstruction Based on Convolutional Neural Network", 2017 10th International Conference on Intelligent Computation Technology and Automation, Oct. 9-10, 2017, Changsha, China.

Farrell et al., "Resolution and Light Sensitivity Tradeoff with Pixel Size", Proceedings of the SPIE Electronic Imaging 2006 Conference, Feb. 2, 2006, vol. 6069, 8 pgs.

Farsiu et al., "Advances and Challenges in Super-Resolution", International Journal of Imaging Systems and Technology, Aug. 12, 2004, vol. 14, pp. 47-57.

Farsiu et al., "Fast and Robust Multiframe Super Resolution", IEEE Transactions on Image Processing, Oct. 2004, published Sep. 3, 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.

Fechteler et al., Fast and High Resolution 3D Face Scanning, IEEE International Conference on Image Processing, Sep. 16-Oct. 19, 2007, 4 pgs.

Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., "Optical System Design", 2nd Edition, SPIE Press, Feb. 14, 2008, pp. 49-58.

Fischer et al., "Optical System Design", 2nd Edition, SPIE Press, Feb. 14, 2008, pp. 191-198.

Garg et al., "Unsupervised CNN for Single View Depth Estimation: Geometry to the Rescue", In European Conference on Computer Vision, Springer, Cham, Jul. 2016, 16 pgs.

Gastal et al., "Shared Sampling for Real-Time Alpha Matting", Computer Graphics Forum, Eurographics 2010, vol. 29, Issue 2, May 2010, pp. 575-584.

Georgeiv et al., "Light Field Camera Design for Integral View Photography", Adobe Systems Incorporated, Adobe Technical Report, 2003, 13 pgs.

Georgiev et al., "Light-Field Capture by Multiplexing in the Frequency Domain", Adobe Systems Incorporated, Adobe Technical Report, 2003, 13 pgs.

(56) References Cited

OTHER PUBLICATIONS

Godard et al., "Unsupervised Monocular Depth Estimation with Left-Right Consistency", In Proceedings of the IEEE Conference on Computer Vision and Pattern Recognition, 2017, 14 pgs.
Goldman et al., "Video Object Annotation, Navigation, and Composition", In Proceedings of UIST 2008, Oct. 19-22, 2008, Monterey CA, USA, pp. 3-12.
Goodfellow et al., "Generative Adversarial Nets, 2014. Generative adversarial nets", In Advances in Neural Information Processing Systems (pp. 2672-2680).
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. 1-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger Er Al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>, pp. 1-8.
Jourabloo, "Large-Pose Face Alignment via CNN-Based Dense 3D Model Fitting", I CCV IEEE 11th International Conference on Computer Vision; Publication [online]. Oct. 2007 [retrieved Jul. 28, 2014]. Retrieved from the Internet: < URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.

(56) References Cited

OTHER PUBLICATIONS

Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D template matching for pose invariant face recognition using 3D facial model built with isoluminance line based stereo vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
LensVector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR 2005-02, Apr. 20, 2005, pp. 1-11.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.

(56) References Cited

OTHER PUBLICATIONS

Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI:10.1109/ICCV.1998.710696 · Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses". Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental verification", Applied Optics, Apr. 10, 2001, vol. 40, No. 11, pp. 1806-1813.
Tanida et al., "Color imaging with an integrated compound imaging system", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer, vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 (online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS

(56) References Cited

OTHER PUBLICATIONS

Technology", Proceedings of the World Congress on Engineering and Computer Science 2008, WCECS 2008, Oct. 22-24, 2008, 5 pgs.

Wang, "Calculation of Image Position, Size and Orientation Using First Order Properties", Dec. 29, 2010, OPTI521 Tutorial, 10 pgs.

Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pg., published Aug. 5, 2007.

Wang et al., "Automatic Natural Video Matting with Depth", 15th Pacific Conference on Computer Graphics and Applications, PG '07, Oct. 29-Nov. 2, 2007, Maui, HI, USA, pp. 469-472.

Wang et al., "Image and Video Matting: A Survey", Foundations and Trends, Computer Graphics and Vision, vol. 3, No. 2, 2007, pp. 91-175.

Wang et al., "Facial Feature Point Detection: A Comprehensive Survey", arXiv: 1410.1037v1, Oct. 4, 2014, 32 pgs.

Wetzstein et al., "Computational Plenoptic Imaging", Computer Graphics Forum, 2011, vol. 30, No. 8, pp. 2397-2426.

Wheeler et al., "Super-Resolution Image Synthesis Using Projections Onto Convex Sets in the Frequency Domain", Proc. SPIE, Mar. 11, 2005, vol. 5674, 12 pgs.

Widanagamaachchi et al., "3D Face Recognition from 2D Images: A Survey", Proceedings of the International Conference on Digital Image Computing: Techniques and Applications, Dec. 1-3, 2008, 7 pgs.

Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.

Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.

Wilburn, "High Performance Imaging Using Arrays of Inexpensive Cameras", Thesis of Bennett Wilburn, Dec. 2004, 128 pgs.

Wilburn et al., "High Performance Imaging Using Large Camera Arrays", ACM Transactions on Graphics, Jul. 2005, vol. 24, No. 3, pp. 1-12.

Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.

Wilburn et al., "The Light Field Video Camera", Proceedings of Media Processors 2002, SPIE Electronic Imaging, 2002, 8 pgs.

Wippermann et al., "Design and fabrication of a chirped array of refractive ellipsoidal micro-lenses for an apposition eye camera objective", Proceedings of SPIE, Optical Design and Engineering II, Oct. 15, 2005, pp. 59622C-1-59622C-11.

Wu et al., "A virtual view synthesis algorithm based on image inpainting", 2012 Third International Conference on Networking and Distributed Computing, Hangzhou, China, Oct. 21-24, 2012, pp. 153-156.

Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

Yang et al., "Superresolution Using Preconditioned Conjugate Gradient Method", Proceedings of SPIE—The International Society for Optical Engineering, Jul. 2002, 8 pgs.

Yang et al., "A Real-Time Distributed Light Field Camera", Eurographics Workshop on Rendering (2002), published Jul. 26, 2002, pp. 1-10.

Yang et al., Model-based Head Pose Tracking with Stereovision, Microsoft Research, Technical Report, MSR-TR-2001-102, Oct. 2001, 12 pgs.

Yokochi et al., "Extrinsic Camera Parameter Estimation Based-on Feature Tracking and GPS Data", 2006, Nara Institute of Science and Technology, Graduate School of Information Science, LNCS 3851, pp. 369-378.

Zbontar et al., Computing the Stereo Matching Cost with a Convolutional Neural Network, CVPR, 2015, pp. 1592-1599.

Zhang et al., "A Self-Reconfigurable Camera Array", Eurographics Symposium on Rendering, published Aug. 8, 2004, 12 pgs.

Zhang et al., "Depth estimation, spatially variant image registration, and super-resolution using a multi-lenslet camera", proceedings of SPIE, vol. 7705, Apr. 23, 2010, pp. 770505-770505-8, XP055113797 ISSN: 0277-786X, DOI: 10.1117/12.852171.

Zhang et al., "Spacetime Faces: High Resolution Capture for Modeling and Animation", ACM Transactions on Graphics, 2004, 11pgs.

Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.

Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.

Zomet et al., "Robust Super-Resolution", IEEE, 2001, pp. 1-6.

"File Formats Version 6", Alias Systems, 2004, 40 pgs.

"Light fields and computational photography", Stanford Computer Graphics Laboratory, Retrieved from: http://graphics.stanford.edu/projects/lightfield/, Earliest publication online: Feb. 10, 1997, 3 pgs.

"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.

Systems and Equipment, JEITA CP-3451, Apr. 2002, Retrieved from: http://www.exif.org/Exif2-2.PDF, 154 pgs.

An, Gwon Hwan, et al. "Charuco Board-Based Omnidirectional Camera Calibration Method." *Electronics* 7.12 (2018): 421, 15 pages.

Atkinson, Gary A. et al. Recovery of Surface Orientation From Diffuse Polarization. IEEE Transactions on Image Processing, vol. 15, No. 6, Jun. 6, 2006, pp. 1653-1664.

Garrido-Jurado, Sergio, et al. "Automatic generation and detection of highly reliable fiducial markers under occlusion." *Pattern Recognition* 47 (2014): 2280-2292.

Güler, Riza Alp et al., "DensePose: Dense Human Pose Estimation In The Wild," arXiv:1802.00434v1, Feb. 1, 2018, pp. 1-12.

He, Kaiming, et al. "Mask R-CNN." *Proceedings of the IEEE International Conference on Computer Vision*. 2017, pp. 2961-2969.

He, Kaiming et al., Deep Residual Learning for Image Recognition. In Proceedings of the IEEE Conference on Computer Vision and Pattern Recognition, pp. 770-778, 2016.

Howard, Andrew, et al. "Searching for MobileNetV3." Proceedings of the IEEE International Conference on Computer Vision. 2019, pp. 1314-1324.

Howard, Andrew G., et al. "Mobilenets: Efficient Convolutional Neural Networks for Mobile Vision Applications." arXiv preprint arXiv:1704.04861 (2017), pp. 1-9.

Jiang, Yue et al., "SDFDiff: Differentiable Rendering of Signed Distance Fields for 3D Shape Optimization," University of Maryland, College Park, CVPR, 2020, pp. 1251-1261.

Kato, Hiroharu et al., "Differentiable Rendering: A Suvey," arXiv:2006.12057v2, Jul. 31, 2020, 20 pages.

Krizhevsky, Alex, et al. "ImageNet classification with deep convolutional neural networks." Advances in neural information processing systems. 2012, pp. 1-9.

Kurenkov, Andrey, et al. "Deformnet: Free-form Deformation Network for 3D Shape Reconstruction from a Single Image." *2018 IEEE Winter Conference on Applications of Computer Vision (WACV)*. IEEE, 2018, 9 pages.

Li, Yinxiao, "Real-time Pose Estimation of Deformable Objects Using a Volumetric Approach," 2014 IEEE/RSJ International Con-

(56) References Cited

OTHER PUBLICATIONS ference on Intelligent Robots and Systems (IROS 2014), Sep. 14-18, 2014, Chicago, IL, pp. 1046-1052.
Lin, Tsung-Yi, et al. "Feature Pyramid Networks for Object Detection." *Proceedings of the IEEE Conference on Computer Vision and Pattern Recognition*. 2017, pp. 2117-2125.
Liu, Shichen, et al. "Soft Rasterizer: A Differentiable Renderer for Image-based 3d Reasoning." *Proceedings of the IEEE/CVF International Conference on Computer Vision*. 2019, pp. 7708-7717.
Nair, Ashvin, et al. "Combining self-supervised learning and imitation for vision-based rope manipulation." *2017 IEEE international conference on robotics and automation (ICRA)*. IEEE, 2017, 8 pages.
Pan, Junyi, et al., "Deep Mesh Reconstruction from Single RGB Images via Topology Modification Networks," ICCV, 2019, pp. 9964-9973.
Petersen, Felix, et al., "Pix2Vex: Image-to-Geometry Reconstruction using a Smooth Differentiable Renderer," arXiv:1903.11149v2, May 26, 2019, pp. 1-13.
Ronneberger, Olaf, et al. "U-Net: Convolutional Networks for Biomedical Image Segmentation." *International Conference on Medical Image Computing and Computer-Assisted Intervention*. Springer, Cham, 2015, pp. 1-8.
Sanchez, Jose, et al., "Robotic Manipulation and Sensing of Deformable Objects in Domestic and Industrial Applications: A Survey," The International Journal of Robotics Research, SAGE Publications, In press, 37 (7), pp. 688-716.
Sandhu, Romeil et al. "Non-Rigid 2D-3D Pose Estimation and 2D Image Segmentation," IEEE, 2009, pp. 786-793.
Sandler, Mark, et al. "MobileNetV2: Inverted Residuals and Linear Bottlenecks." Proceedings of the IEEE Conference on Computer Vision and Pattern Recognition. 2018, pp. 4510-4520.
Simonyan, Karen, et al. "Very Deep Convolutional Networks For Large-Scale Image Recognition." arXiv preprint arXiv:1409.1556v6 (2014), Published as a conference paper at ICLR 2015, pp. 1-14.
Tian, Meng et al., "Shape Prior Deformation for Categorical 6D Object Pose and Size Estimation," arXiv:2007.08454v1 Jul. 16, 2020, 21 pages.
Wang, Nanyang, et al., "Pixel2Mesh: Generating 3D Mesh Models from Single RGB Images," arXiv:1804.01654v2, Aug. 3, 2018, 16 pages.
Xiang, Yu et al., "PoseCNN: A Convolutional Neural Network for 6D Object Pose Estimation in Cluttered Scenes," arXiv:1711.00199v3, May 26, 2018, 10 pages.
Yifan, Wang et al. "Differentiable Surface Splatting for Point-based Geometry Processing" arXiv:1906.04173v3, Sep. 3, 2019, 14 pages.
International Search Report and Written Opinion in International Appln. No. PCT/US22/24114, dated Aug. 16, 2022, 11 pages.
International Preliminary Report on Patentability in International Appln. No. PCT/US2022/024114, dated Oct. 26, 2023, 10 pages.

\* cited by examiner

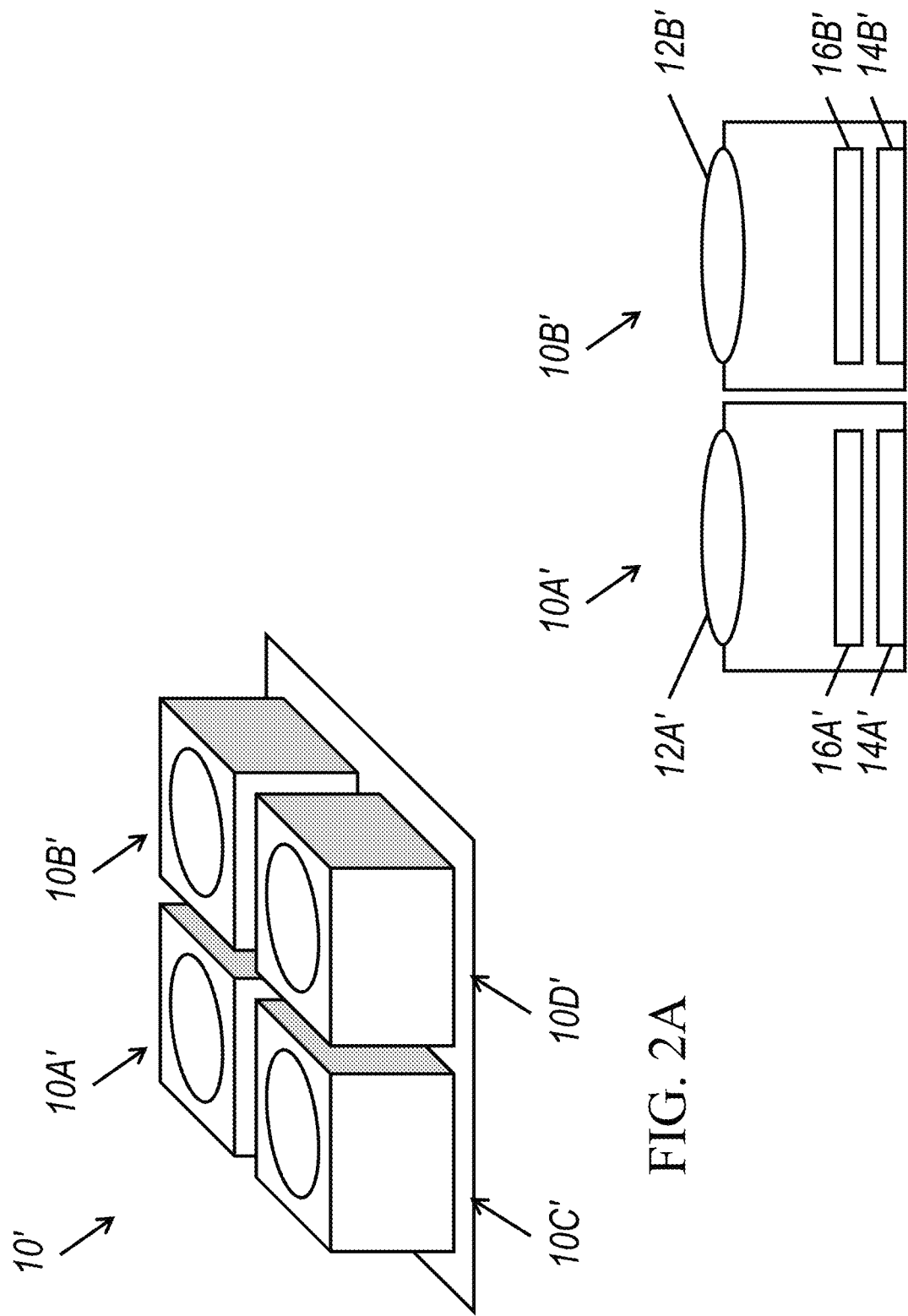

SYSTEMS AND METHODS FOR SIX-DEGREE OF FREEDOM POSE ESTIMATION OF DEFORMABLE OBJECTS

FIELD

Aspects of embodiments of the present disclosure relate to the field of sensors systems and methods for six-degree of freedom pose estimation of objects in a scene, including deformable objects located in the scene.

BACKGROUND

In many areas of automation, such as robotics, sensors are used to determine the physical relationship of objects in the real world. For example, robotic systems often use sensing systems to measure the locations of various physical objects in order to, for example, grasp an object that may arrive at a variety of orientations, reorient the object into a desired position, and connect the object to another object. The position and orientation of an object with respect to a reference coordinate system may be referred to as a "pose" and, in a three-dimensional coordinate system, generally includes six degrees of freedom—rotation around three axes and translation along the three axes.

SUMMARY

Aspects of embodiments of the present disclosure relate to the field of sensors, in particular systems and methods for performing measurements of the poses of objects in a scene.

According to one embodiment of the present disclosure, a method for estimating a pose of a deformable object includes: receiving, by a processor, a plurality of images depicting the deformable object from multiple viewpoints; computing, by the processor, one or more object-level correspondences and a class of the deformable object depicted in the images; loading, by the processor, a 3-D model corresponding to the class of the deformable object; aligning, by the processor, the 3-D model to the deformable object depicted in the plurality of images to compute a six-degree of freedom (6-DoF) pose of the object; and outputting, by the processor, the 3-D model and the 6-DoF pose of the object.

The loading the 3-D model may include loading the 3-D model from a library including 3-D models of a plurality of different classes of objects.

The 3-D model may include a surface texture, and the aligning the 3-D model may include: computing, by the processor, a plurality of uv correspondence maps between the surface texture of the 3-D model and corresponding ones of the plurality of images; matching, by the processor, correspondences between the images and locations in 3-D coordinate space to compute an initial deformation and pose of the 3-D model; and updating, by the processor, a plurality of locations of a plurality of vertices of the 3-D model to deform the 3-D model to match the images of the object.

The computing the uv correspondence maps may include supplying the images to a trained neural network.

The computing the uv correspondence maps may include supplying the images to a keypoint detector and detecting corresponding locations of keypoints in the images and in the surface texture of the 3-D model.

The updating the locations of the vertices may be subject to physical constraints on the vertices, the physical constraints being specified in the 3-D model.

The loading the 3-D model may include: loading the 3-D model from a library of 3-D models including a collection of 3-D models corresponding to the class of the deformable object, the 3-D models of the collection representing different physical configurations of an object of the class; and selecting the 3-D model based on a closest matching model from the collection of 3-D models of corresponding to the class.

The aligning the 3-D model may include: refining a deformation of the 3-D model selected from the collection of 3-D models by updating a plurality of vertex positions of a plurality of vertices to match appearances of the object in the images captured from the multiple viewpoints.

The collection of 3-D models may include a plurality of synthesized 3-D modes generated from an initial 3-D model corresponding to the class of the deformable object in one configuration by: generating a first scene including the initial 3-D model deformed into a first deformed 3-D model in accordance with a physics simulation engine under a plurality of simulation conditions; perturbing the simulation conditions to produce a plurality of perturbed simulation conditions; and rendering a second scene including the initial 3-D model deformed into a second deformed 3-D model in accordance with the physics simulation engine under the perturbed simulation conditions.

The collection of 3-D models may include a plurality of captured 3-D models of a physical object of the class of the deformable object, the captured 3-D models corresponding to captures of the physical object deformed into a plurality of configurations.

The aligning the 3-D model may include refining a plurality of vertex positions of a plurality of vertices of the 3-D model to match appearances of the object in the images captured from the multiple viewpoints.

The refining the plurality of vertex positions may be performed based on minimizing a loss function E including the sum of a first component $E_1$ and a second component $E_2$, wherein $E_1$ represents pixel-level differences between an appearance of the object in the images and an appearance of the object in renderings of the 3-D model in a current pose from viewpoints corresponding to the images, and wherein $E_2$ represents a degree of alignment of a silhouette of the object in the images and a silhouette of the 3-D model in the renderings of the 3-D model from the viewpoints corresponding to the images.

The renderings may be generated from the 3-D model by a pipeline including a differentiable renderer, and the plurality of vertex positions may be updated by backpropagating errors computed by the loss function E through the pipeline including the differentiable renderer.

The refining the plurality of positions of the vertices may be performed by a transformation neural network trained to compute a deformed 3-D model based on an input canonical 3-D model and the images of the object, the transformation neural network including: a feature extraction network trained to extract multiscale features from the images; and a graph convolutional neural network trained to generate the deformed 3-D model from the multiscale features and the input canonical 3-D model.

The transformation neural network may be trained based on training data including a plurality of training samples, each of the training samples including a 3-D model deformed in accordance with a generated scene and multi-view renderings of the 3-D model corresponding to images rendered from different virtual viewpoints.

The aligning the 3-D model may include updating a current pose to minimize a loss function E including the sum of a first component $E_1$ and a second component $E_2$, wherein $E_1$ represents pixel-level differences between an appearance of the object in the images and an appearance of the object in renderings of the 3-D model in the current pose from viewpoints corresponding to the images, and wherein $E_2$ represents a degree of alignment of a silhouette of the object in the images and a silhouette of the 3-D model in the renderings of the 3-D model from the viewpoints corresponding to the images.

The first component $E_1$ of the loss function E may be $$E_1 = \sum_{n=1}^{N} \|R_n(M) - I_n\|_2$$

where $I_n$ is an image from viewpoint n among N viewpoints, $R_n(M)$ is a rendering of the 3-D model M from viewpoint n, and the 3-D model M is a function of translation and rotation parameters of the current pose.

The first component $E_1$ of the loss function E may include differences between rendered surface normals of the 3-D model and images corresponding to surface normals maps of surfaces.

The surface normals maps may be computed from polarization raw frames.

The second component $E_2$ of the loss function E may be:

$$E_2 = \sum_{n=1}^{N} 1 - \|S_{pn} \otimes S_n\|_1 / \|S_{pn} \oplus S_n - S_{pn} \otimes S_n\|_1$$

wherein $S_{pn}$ is the silhouette of the 3-D model as it appears in a rendering from an n-th viewpoint $R_n(M)$ and $S_n$ is the silhouette of the object as it appears in the image $I_n$ from the n-th viewpoint, wherein the $\otimes$ operator is a pixel-wise product operator, and wherein the $\oplus$ operator is a pixel-wise addition operator.

The images may include polarization raw frames.

According to one embodiment of the present disclosure, a system for estimating a pose of a deformable object includes: a camera system configured to capture images of a scene from multiple viewpoints; a processor configured to receive the images of the scene from the camera system; and memory storing instructions that, when executed by the processor, cause the processor to: receive a plurality of images depicting the deformable object from multiple viewpoints; compute one or more object-level correspondences and a class of the deformable object depicted in the images; load a 3-D model corresponding to the class of the deformable object; align the 3-D model to the deformable object depicted in the plurality of images to compute a six-degree of freedom (6-DoF) pose of the object; and output the 3-D model and the 6-DoF pose of the object.

The instructions to load the 3-D model include instructions that, when executed by the processor, cause the processor to load the 3-D model from a library including 3-D models of a plurality of different classes of objects.

The 3-D model may include a surface texture, and the instructions to align the 3-D model may include instructions that, when executed by the processor, cause the processor to: compute a plurality of uv correspondence maps between the surface texture of the 3-D model and corresponding ones of the plurality of images; match correspondences between the images and locations in 3-D coordinate space to compute an initial deformation and pose of the 3-D model; and update a plurality of locations of a plurality of vertices of the 3-D model to deform the 3-D model to match the images of the object.

The instructions to compute the uv correspondence maps may include instructions that, when executed by the processor, cause the processor to supply the images to a trained neural network.

The instructions to compute the uv correspondence maps may include instructions that, when executed by the processor, cause the processor to: supply the images to a keypoint detector and to detecting corresponding locations of keypoints in the images and in the surface texture of the 3-D model.

The instructions to update the locations of the vertices may include instructions that, when executed by the processor, cause the processor subject the update to physical constraints on the vertices, the physical constraints being specified in the 3-D model.

The instructions to load the 3-D model may include instructions that, when executed by the processor, cause the processor to: load the 3-D model from a library of 3-D models including a collection of 3-D models corresponding to the class of the deformable object, the 3-D models of the collection representing different physical configurations of an object of the class; and select the 3-D model based on a closest matching model from the collection of 3-D models of corresponding to the class.

The instructions to align the 3-D model may include instructions that, when executed by the processor, cause the processor to: refine a deformation of the 3-D model selected from the collection of 3-D models by updating a plurality of vertex positions of a plurality of vertices to match appearances of the object in the images captured from the multiple viewpoints.

The collection of 3-D models includes a plurality of synthesized 3-D modes generated from an initial 3-D model corresponding to the class of the deformable object in one configuration by: generating a first scene including the initial 3-D model deformed into a first deformed 3-D model in accordance with a physics simulation engine under a plurality of simulation conditions; perturbing the simulation conditions to produce a plurality of perturbed simulation conditions; and rendering a second scene including the initial 3-D model deformed into a second deformed 3-D model in accordance with the physics simulation engine under the perturbed simulation conditions.

The collection of 3-D models may include a plurality of captured 3-D models of a physical object of the class of the deformable object, the captured 3-D models corresponding to captures of the physical object deformed into a plurality of configurations.

The instructions to align the 3-D model may include instructions that, when executed by the processor, cause the processor to refine a plurality of vertex positions of a plurality of vertices of the 3-D model to match appearances of the object in the images captured from the multiple viewpoints.

The instructions to refine the plurality of vertex positions may include instructions to perform the refinement based on minimizing a loss function E including the sum of a first component $E_1$ and a second component $E_2$, wherein $E_1$ represents pixel-level differences between an appearance of the object in the images and an appearance of the object in renderings of the 3-D model in a current pose from viewpoints corresponding to the images, and wherein $E_2$ represents a degree of alignment of a silhouette of the object in the images and a silhouette of the 3-D model in the renderings of the 3-D model from the viewpoints corresponding to the images.

The renderings may be generated from the 3-D model by a pipeline including a differentiable renderer, and the plurality of vertex positions may be updated by backpropagating errors computed by the loss function E through the pipeline including the differentiable renderer.

The instructions to refine the plurality of positions of the vertices may include instructions that, when executed by the processor, cause the processor perform the refinement by a transformation neural network trained to compute a deformed 3-D model based on an input canonical 3-D model and the images of the object, the transformation neural network including: a feature extraction network trained to extract multiscale features from the images; and a graph convolutional neural network trained to generate the deformed 3-D model from the multiscale features and the input canonical 3-D model.

The transformation neural network may be trained based on training data including a plurality of training samples, each of the training samples including a 3-D model deformed in accordance with a generated scene and multi-view renderings of the 3-D model corresponding to images rendered from different virtual viewpoints.

The instructions to align the 3-D model may include instructions that, when executed by the processor, cause the processor to update a current pose to minimize a loss function E including the sum of a first component $E_1$ and a second component $E_2$, wherein $E_1$ represents pixel-level differences between an appearance of the object in the images and an appearance of the object in renderings of the 3-D model in the current pose from viewpoints corresponding to the images, and wherein $E_2$ represents a degree of alignment of a silhouette of the object in the images and a silhouette of the 3-D model in the renderings of the 3-D model from the viewpoints corresponding to the images.

The first component $E_1$ of the loss function E may be:

$$E_1 = \sum_{n=1}^{N} \|R_n(M) - I_n\|_2$$

where $I_n$ is an image from viewpoint n among N viewpoints, $R_n(M)$ is a rendering of the 3-D model M from viewpoint n, and the 3-D model M is a function of translation and rotation parameters of the current pose.

The first component $E_1$ of the loss function E may include differences between rendered surface normals of the 3-D model and images corresponding to surface normals maps of surfaces.

The surface normals maps may be computed from polarization raw frames.

The second component $E_2$ of the loss function E may be:

$$E_2 = \sum_{n=1}^{N} 1 - \|S_{pn} \otimes S_n\|_1 / \|S_{pn} \oplus S_n - S_{pn} \otimes S_n\|_1$$

wherein $S_{pn}$ is the silhouette of the 3-D model as it appears in a rendering from an n-th viewpoint $R_n(M)$ and $S_n$ is the silhouette of the object as it appears in the image $I_n$ from the n-th viewpoint, wherein the $\otimes$ operator is a pixel-wise product operator, and wherein the $\oplus$ operator is a pixel-wise addition operator.

The images may include polarization raw frames.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a perspective view of a camera array according to one embodiment of the present disclosure.

FIG. 2B is a cross sectional view of a portion of a camera array according to one embodiment of the present disclosure.

DETAILED DESCRIPTION

Figure 1A:
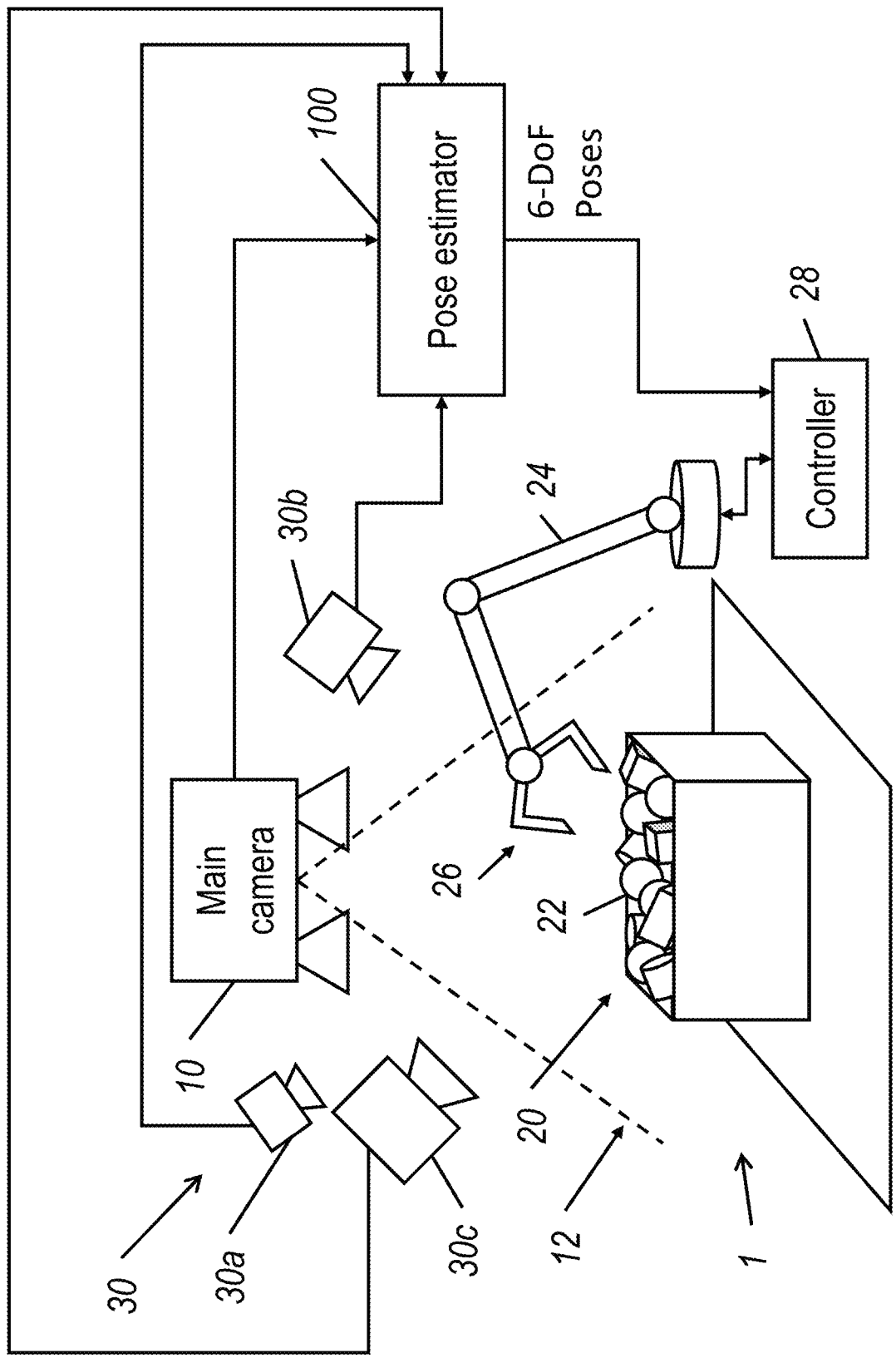
FIG. 1A is a schematic diagram depicting a pose estimation system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Pose estimation generally refers to a technique for estimating or predicting the location and orientation of objects. Some forms of pose estimation refer to detecting the physical pose of a human figure, such as the position and orientation of a person's head, arms, legs, and joints. Pose estimation may also refer more generally to the position and orientation of various animate or inanimate physical objects in a scene. For example, autonomously navigating robots may maintain information regarding the physical poses of objects around them (e.g., humans, vehicles, equipment, other robots, barriers, doors, and the like) in order to avoid collisions and to predict trajectories of other moving objects. As another example, in the case of robotics for use in manufacturing, pose estimation may be used to detect the position and orientation of components and workpieces such that a robotic arm can approach the components and workpieces from the correct angle to obtain a proper grip on the part for assembly with other components of a manufactured product (e.g., gripping the head of a screw and threading the screw into a hole, whereas gripping a screw by the tip would make it difficult to insert into a hole, or gripping a flexible printed circuit, flexible circuit, or flex circuit and attaching the ends of the connector to different components of the manufactured product, such as connecting a flexible printed circuit to two different rigid circuit boards) and orient and/or reorient components and workpieces for assembly.

Aspects of embodiments of the present disclosure relate to systems and methods for automated six degree of freedom (6-DoF) estimation of a wide variety of objects in a scene. The six degrees of freedom in three dimensional space include positional coordinates (e.g., x, y, and z translational coordinates in a three-dimensional global coordinate system) and orientation coordinates (e.g., $\theta$, $\phi$, and $\psi$ rotational coordinates in the three-dimensional global coordinate system).

Estimating the 6-DoF poses of deformable objects is useful in the field of robotics, such as in robotic systems that manipulate deformable objects. In particular, robotic systems may use the 6-DoF poses of objects in a scene to determine which of the objects are graspable. (An object may be considered to be graspable if it is not blocked by other objects and having mechanically stable surfaces that can be grasped by the end effector of a robotic arm without damaging the object). The robotic system may then grasp a detected graspable object and manipulate that object in some way (e.g., attach a flexible component to an object of manufacture, pick a deformable item and pack the deformable item into a box for shipping, or maintain control of a deformable object during transport). Robotic systems may also be commonly applied to bin packing or placing deformable items into a bin (such as a rigid box for shipping). Examples of such deformable objects include food packaging (bags of chips, candy, etc.), mechanical springs, folded clothing, and the like.

Some approaches to estimating the 6-DoF poses of objects involve aligning a given 3-D model of the object with the object as observed in the environment. This enables the robotic system to determine the pose of the physical object based on the virtual pose of the aligned 3-D model. However, in the case of deformable objects, these existing 3-D models may not be representative of the actual 3-D configurations of the objects in the real world. For example, a 3-D model of a rope may depict the rope in a bundled state, but the actual rope may be folded or twisted, such that the 3-D model of the rope is not representative of the physical rope that is presented to the robotic system. Likewise, a 3-D model of a flex circuit may depict the flex circuit in a flat or substantially planar shape, whereas the flex circuit that is present in the environment may be curved or bent at various portions, due to interactions with external forces such as gravity and other objects in contact with the flex circuit. The process of grasping the object may deform the object from its configuration prior to grasping, and the configuration of the object may further change in the course of manipulating the object (e.g., through interaction with gravity and other forces in the environment).

Some comparative approaches to estimating the poses of deformable objects relate to the special case of garments (or clothing) as viewed on bodies. Some other comparative approaches relate to the special case of estimating the poses of human bodies and other articulated objects that have well-defined constraints within which the poses may vary (e.g., constraints set by the range of motion of human joints).

Aspects of embodiments of the present disclosure relate to improving the accuracy of the detection of 6-DoF poses of the general case of arbitrary objects, including arbitrary deformable objects. Arbitrary deformable objects include objects that have at least some portions that are continuously pliable (e.g., a cloth, a rope or string, wires and cables, flexible tubing, soft rubber parts, a bag or other pliable container containing rigid or soft objects and/or fluids, foam packing materials, flex circuits which may have rigid connectors at their ends, or the like), objects that are pliable and that retain their shapes after being bent into various shapes (e.g., metal wires, metal sheets or foil, and the like), and objects that may have a stable (e.g., low energy) configuration but that can also be deformed into other configurations (e.g., springs, firm rubber parts, and the like). The accurate estimation of the 6-DoF poses of deformable objects enables robotic systems to accurately pick such deformable objects, thereby expanding the scope of robotic automation.

Some aspects of embodiments of the present disclosure relate to detecting the poses of deformable objects having three-dimensional shapes that can vary continuously through a range of possible configurations. The term "configuration" may be used herein to refer to a physical arrangement of different parts of an object with respect to an object coordinate system (as opposed to a world or global coordinate system). For example, a rigid object may be considered to have a single "configuration," as the term is used herein, even through its pose within its external environment can be varied (e.g., the rigid object can be rotated and positioned with six degrees of freedom in the external environment). On the other hand, a hinge may have an infinite number of possible configurations because the angle between the components on the opposite sides of the hinge may vary continuously between the extremes of the range of motion. Likewise, a rope may have an infinite number of configurations because every point along the length of the rope may be bent and/or twisted as constrained by the flexibility or pliability of the rope. The configuration of an object may alternatively be referred to herein as a "physical configuration" and/or an "object configuration."

Some aspects of embodiments of the present disclosure relate to various techniques for estimating the three-dimensional, six-degree-of-freedom (6DoF) poses of deformable objects, including embodiments in which these techniques are used individually (e.g., only one technique is applied) as well as embodiments in which the techniques are used in combination to produce more accurate results. For example, an output of a first technique may be supplied as input to a second technique, different techniques can be implemented in parallel and used as factors in a joint optimization problem, and/or different techniques are used alternatingly using an iterative approach to compute a pose of a deformable object.

The six degrees of freedom in three dimensional space include positional coordinates (e.g., x, y, and z translational coordinates in a three-dimensional global coordinate system) and orientation coordinates (e.g., θ, φ, and ψ rotational coordinates in the three-dimensional coordinate system). A pose estimation system according to embodiments of the present disclosure, may combine the six-dimensional pose of an object within the scene with a 3-D model of the object (e.g., a 3-D mesh model of the object such as a computer aided design or CAD model, where the mesh may include a collection of vertices and edges connecting the vertices, each of the vertices having three-dimensional coordinates (e.g., x, y, z coordinates), and where the three-dimensional coordinates may be represented in an object coordinate system relative to the object itself or a global coordinate system relative to some external environment). In the case of deformable objects, some aspects of embodiments of the present disclosure relate to identifying and/or generating a 3-D model of the object that corresponds to the configuration of the object, as described in more detail below.

In addition, while aspects of embodiments of the present disclosure are described herein in the context of detecting the six-degree-of-freedom poses of deformable objects, in practice, embodiments of the present disclosure described herein can also be applied to detecting the 6DoF poses of rigid objects (e.g., non-deformable objects), and uses or applications of embodiments of the present disclosure are not limited to the case of deformable objects.

FIG. 1A is a schematic diagram depicting a pose estimation system 1 according to one embodiment of the present disclosure. As shown in FIG. 1A, a main camera 10 is arranged such that its field of view 12 captures an arrangement 20 of objects 22 in a scene. In the embodiment shown in FIG. 1A, the main camera 10 is located above the support platform (e.g., spaced apart from the objects 22 along the direction of gravity), but embodiments of the present disclosure are not limited thereto—for example, the main camera 10 can be arranged to have a downward angled view of the objects 22.

In some embodiments, one or more support cameras 30 are arranged at different poses around the scene containing the arrangement 20 of objects 22. Accordingly, each of the support cameras 30, e.g., first support camera 30a, second support camera 30b, and third support camera 30c, captures a different view of the objects 22 from a different view point (e.g., a first viewpoint, a second viewpoint, and a third viewpoint, respectively). While FIG. 1A shows three support cameras 30, embodiments of the present disclosure are not limited thereto and may include, for example, at least one support camera 30 and may include more than three support cameras 30. In addition, while the mail camera 10 is depicted in FIG. 1A as a stereo camera, embodiments of the present disclosure are not limited thereto, and may be used with, for example, a monocular main camera.

A pose estimator 100 according to various embodiments of the present disclosure is configured to compute or estimate poses of the objects 22 based on information captured by the main camera 10 and the support cameras 30. According to various embodiments of the present disclosure, the pose estimator 100 is implemented using one or more processing circuits or electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output 20, such as an instance segmentation map, from input polarization raw frames 18 (the underlying images captured by polarization cameras or cameras with polarization filters in their optical paths). The operations performed by the pose estimator 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the pose estimator 100 may be referred to herein as a computer or a computer system, which may include memory storing instructions that, when executed by the one or more electronic circuits, implement the systems and methods described herein.

In more detail, the main camera 10 and the support cameras 30 are configured to estimate the poses of objects 22 detected within their fields of view 12 (while FIG. 1A illustrates a field of view 12 for the main camera 10 using dashed lines, the fields of view of the support cameras 30 are not explicitly shown). In the embodiment shown in FIG. 1A, the objects 22 are depicted abstractly as simple three-dimensional solids such as spheres, rectangular prisms, and cylinders. However, embodiments of the present disclosure are not limited thereto and characterization of pose estimators may be performed using any arbitrary object for which a pose with respect to a camera can be clearly defined, including deformable objects mentioned above, such as flex circuits, bags or other pliable containers containing solids, liquids, and/or fluids, flexible tubing, and the like.

In particular, a "pose" refers to the position and orientation of an object with respect to a reference coordinate system. For example, a reference coordinate system may be defined with the main camera 10 at the origin, where the direction along the optical axis of the main camera 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses can be mathematically transformed to equivalent representations in different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

As noted above, some aspects of embodiments of the present disclosure relate to computing (e.g., identifying and/or generating) a 3-D model of the object whose pose is being estimated, where the 3-D model has a configuration matching that of the object (e.g., a 3-D model of a flex circuit that is curved and/or twisted in substantially the same way as the flex circuit seen among the objects 22).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB}=P_{err}$) is used to indicate a transform from pose $P_A$ to pose $P_B$, then the following relationship should hold:

$$P_A P_{err} = P_B \quad (1)$$

and therefore $$P_{err} = P_A^{-1} P_B \quad (2)$$

Ideally, assuming the object has not moved (e.g., translated or rotated) with respect to the main camera 10 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In a similar manner, the pose of a particular object can be computed with respect to views from two different cameras. For example, images of Object A captured by a main camera C can be used to compute the pose $P_{CA}$ of Object A with respect to main camera C. Likewise, images of Object A captured by a first support camera $S_1$ can be used to compute the pose $P_{S_1 A}$ of object A with respect to the support camera $S_1$. If the relative poses of main camera C and support camera $S_1$ are known, then the pose $P_{S_1 A}$ can be transformed to the coordinate system of the main camera C.

Ideally, assuming that the known relative poses of main camera C and support camera $S_1$ are accurate and the poses calculated based on the data captured by the two cameras is accurate, then $P_{CA}$ and $P_{S_1 A}$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Differences $P_{err}$ between the actual measured value as computed based on the estimates computed by the pose estimator 100 and the identity matrix may be considered to be errors:

$$R_{err} = \|R(P_{err})\| \tag{3}$$

$$T_{err} = \|T(P_{err})\| \tag{4}$$

where $R_{err}$ is the rotation error and $T_{err}$ is the translation error. The function R( ) converts $P_{err}$ into an axis-angle where the magnitude is the rotation difference, and the function T( ) extracts the translation component of the pose matrix.

The axis-angle representation from rotation matrix R is given by:

$$Tr(R) = 1 + 2\cos\theta \tag{5}$$

$$|\theta| = \arccos\left(\frac{Tr(R) - 1}{2}\right) \tag{6}$$

where Tr( ) denotes the matrix trace (the sum of the diagonal elements of the matrix), and $\theta$ represents the angle of rotation Some aspects of embodiments of the present disclosure relate to computing a high accuracy pose estimate of objects 22 in a scene based on a joint estimate of the poses the objects across the main camera 10 and the support cameras 30. Some aspects of embodiments of the present disclosure also relate to providing information to assist in the control of a robotic arm 24 having an end effector 26 that may be used to grasp and manipulate objects 22. The robotic arm 24, including its end effector 26, may be controlled by a robotic arm controller 28, which receives the six-degree-of-freedom poses computed by the pose estimator 100, which may include 3-D models representing various objects 22 in the scene 1, where the 3-D models have configurations that estimate or approximate the configurations of their corresponding real-world objects, noting, for example, that the configuration of portions of the objects 22 that are occluded or otherwise not visible in the fields of view 12 of the main camera 10 and support cameras 30 may be difficult or impossible to estimate with high accuracy.

Pose Estimation Hardware

In the embodiment shown in FIG. 1A, the pose estimation system 1 includes a main camera 10. and one or more support cameras 30. In some embodiments of the present disclosure, the main camera 10 includes a stereo camera. Examples of stereo cameras include camera systems that have at least two monocular cameras spaced apart from each other along a baseline, where the monocular cameras have overlapping fields of view and optical axes that are substantially parallel to one another. While embodiments of the present disclosure will be presented herein in embodiments where the main camera 10 and the support cameras 30 are passive cameras (e.g., that are not connected to a dedicated light projector and that instead use ambient lighting or other light sources), embodiments of the present disclosure are not limited thereto and may also include circumstances where one or more active light projector are included in the camera system, thereby forming an active camera system, where the active light projector may be configured to project structured light or a pattern onto the scene. The support cameras 30 may be stereo cameras, monocular cameras, or combinations thereof (e.g., some stereo support cameras and some monocular support cameras).

The main camera 10 and the support cameras 30 may use the same imaging modalities or different imaging modalities. Examples of imaging modalities include monochrome, color, infrared, ultraviolet, thermal, polarization, and combinations thereof.

Figure 1B:
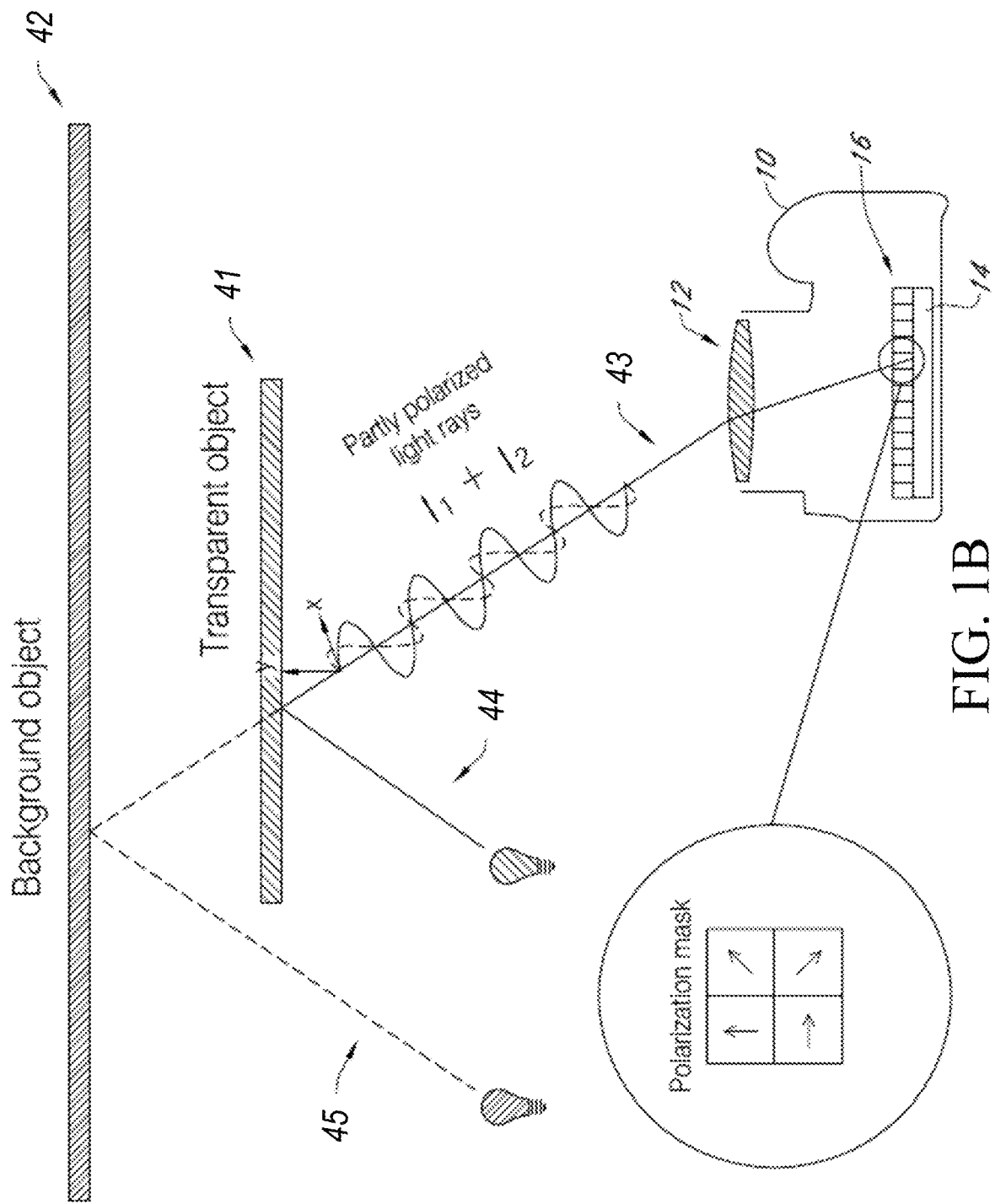
FIG. 1B is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 1B is a high-level depiction of the interaction of light with transparent objects and non-transparent (e.g., diffuse and/or reflective) objects. As shown in FIG. 1B, a polarization camera 10 captures polarization raw frames of a scene that includes a transparent object 41 in front of an opaque background object 42. A light ray 43 hitting the image sensor 14 of the polarization camera 10 contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 1B, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting.

Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$). These properties encode information about the surface curvature and material of the object being imaged, which can be used by the pose estimator 100 to detect transparent objects, as described in more detail below. In some embodiments, by using one or more polarization cameras, the pose estimator 100 can detect other optically challenging objects based on similar polarization properties of light passing through translucent objects and/or light interacting with multipath inducing objects or by non-reflective objects (e.g., matte black objects).

In more detail, the polarization camera 10 may further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oregon.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 10 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 10 located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 2A is a perspective view of a camera array 10' according to one embodiment of the present disclosure. FIG. 2B is a cross sectional view of a portion of a camera array 10' according to one embodiment of the present disclosure. Some aspects of embodiments of the present disclosure relate to a camera array in which multiple cameras (e.g., cameras having different imaging modalities and/or sensitivity to different spectra) are arranged adjacent to one another and in an array and may be controlled to capture images in a group (e.g., a single trigger may be used to control all of the cameras in the system to capture images concurrently or substantially simultaneously). In some embodiments, the individual cameras are arranged such that parallax shift between cameras is substantially negligible based on the designed operating distance of the camera system to objects 2 and 3 in the scene 1, where larger spacings between the cameras may be tolerated when the designed operating distance is large.

FIG. 2B shows a cross sectional view of two of the cameras 10A' and 10B' of the camera array 10' shown in FIG. 2A. As seen in FIG. 2B, each camera or camera module (10A' and 10B') includes a corresponding lens, a corresponding image sensor, and may include one or more corresponding filters. For example, in some embodiments, camera 10A' is a visible light color camera that includes lens 12A', image sensor 14A', and color filter 16A' (e.g., a Bayer filter). In the embodiment shown in FIG. 2B, the filter 16 is located behind the lens 12 (e.g., between the lens 12 and the image sensor 14), but embodiments of the present disclosure are not limited thereto. In some embodiments, the filter 16 is located in front of the lens 12, and in some embodiments, the filter 16 may include multiple separate components, where some components are located in front of the lens and other components are located behind the lens (e.g., a polarizing filter in front of the lens 12 and a color filter behind the lens 12). In some embodiments, camera 10B' is a polarization camera that includes lens 12B', image sensor 14B', and polarizing filter 16B' (a polarization camera may also include a visible light color filter or other filter for passing a particular portion of the electromagnetic spectrum, such as an infrared filter, ultraviolet filter, and the like). In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the filters 16 may correspond to different portions of a single physical layer that has different optical filter functions (e.g., different linear polarizing angles or circular polarizers, color filters with corresponding spectral response functions, and the like) in different regions of the layer (corresponding to the different cameras). In some embodiments, a filter 16 of a polarization camera includes a polarization mask 16 similar to the Sony® IMX250MZR sensor, which includes a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, a camera of the camera array 10' may use a polarization mask 16 to concurrently or simultaneously capture light at four different linear polarizations.

In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

As noted above, embodiments of the present disclosure relate to multi-modal and/or multi-spectral camera arrays. Accordingly, in various embodiments of the present disclosure, the cameras within a particular camera array include cameras configured to perform imaging in a plurality of different modalities and/or to capture information in a plurality of different spectra.

As one example, in some embodiments, the first camera 10A' is a visible light camera that is configured to capture color images in a visible portion of the electromagnetic spectrum, such as by including a Bayer color filter 16A' (and, in some cases, a filter to block infrared light), and the second camera 10B', third camera 10C', and fourth camera 10D' are polarization cameras having different polarization filters, such filters having linear polarization angles of 0°, 60°, and 120°, respectively. The polarizing filters in the optical paths of each of the cameras in the array cause differently polarized light to reach the image sensors of the cameras. The individual polarization cameras in the camera array have optical axes that are substantially perpendicular to one another, are placed adjacent to one another, and have substantially the same field of view, such that the cameras in the camera array capture substantially the same view of a scene as the visible light camera 10A', but with different polarizations. While the embodiment shown in FIG. 2A includes a 2×2 array of four cameras, three of which are polarization cameras, embodiments of the present disclosure are not limited thereto, and the camera array may more than three polarization cameras, each having a polarizing filter with a different polarization state (e.g., a camera array may have four polarization cameras along with the visible light color camera 10A', where the polarization cameras may have polarization filters with angles of linear polarization, such as 0°, 45°, 90°, and 135°). In some embodiments, one or more of the cameras may include a circular polarizer.

As another example, one or more of the cameras in the camera array 10' may operate in other imaging modalities and/or other imaging spectra, such as polarization, near infrared, far infrared, shortwave infrared (SWIR), longwave infrared (LWIR) or thermal, ultraviolet, and the like, by including appropriate filters 16 (e.g., filters that pass light having particular polarizations, near-infrared light, SWIR light, LWIR light, ultraviolet light, and the like) and/or image sensors 14 (e.g., image sensors optimized for particular wavelengths of electromagnetic radiation) for the particular modality and/or portion of the electromagnetic spectrum.

For example, in the embodiment of the camera array 10' shown in FIG. 2A, four cameras 10A', 10B', 10C', and 10D' are arranged in a 2×2 grid to form a camera array, referred to herein as a camera array, where the four cameras have substantially parallel optical axes. The four cameras may be controlled together such that they capture images substantially simultaneously. In some embodiments, the four cameras are configured to capture images using the same exposure settings (e.g., same aperture, length of exposure, and gain or "ISO" settings). In some embodiments, the exposure settings for the different cameras can be controlled independently from one another (e.g., different settings for each camera), where the processing circuit 100 jointly or holistically sets the exposure settings for the cameras based on the current conditions of the scene 1 and the characteristics of the imaging modalities and spectral responses of the cameras 10A', 10B', 10C', and 10D' of the camera array 10'.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 390-402.) or a ChArUco target (see, e.g., An, Gwon Hwan, et al. "Charuco board-based omnidirectional camera calibration method." *Electronics* 7.12 (2018): 421.). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space). Different cameras within a camera array may have image sensors with different sensor formats (e.g., aspect ratios) and/or different resolutions without limitation, and the computed intrinsic and extrinsic parameters of the individual cameras enable the processing circuit 100 to map different portions of the different images to a same coordinate space (where possible, such as where the fields of view overlap).

Figure 2C:
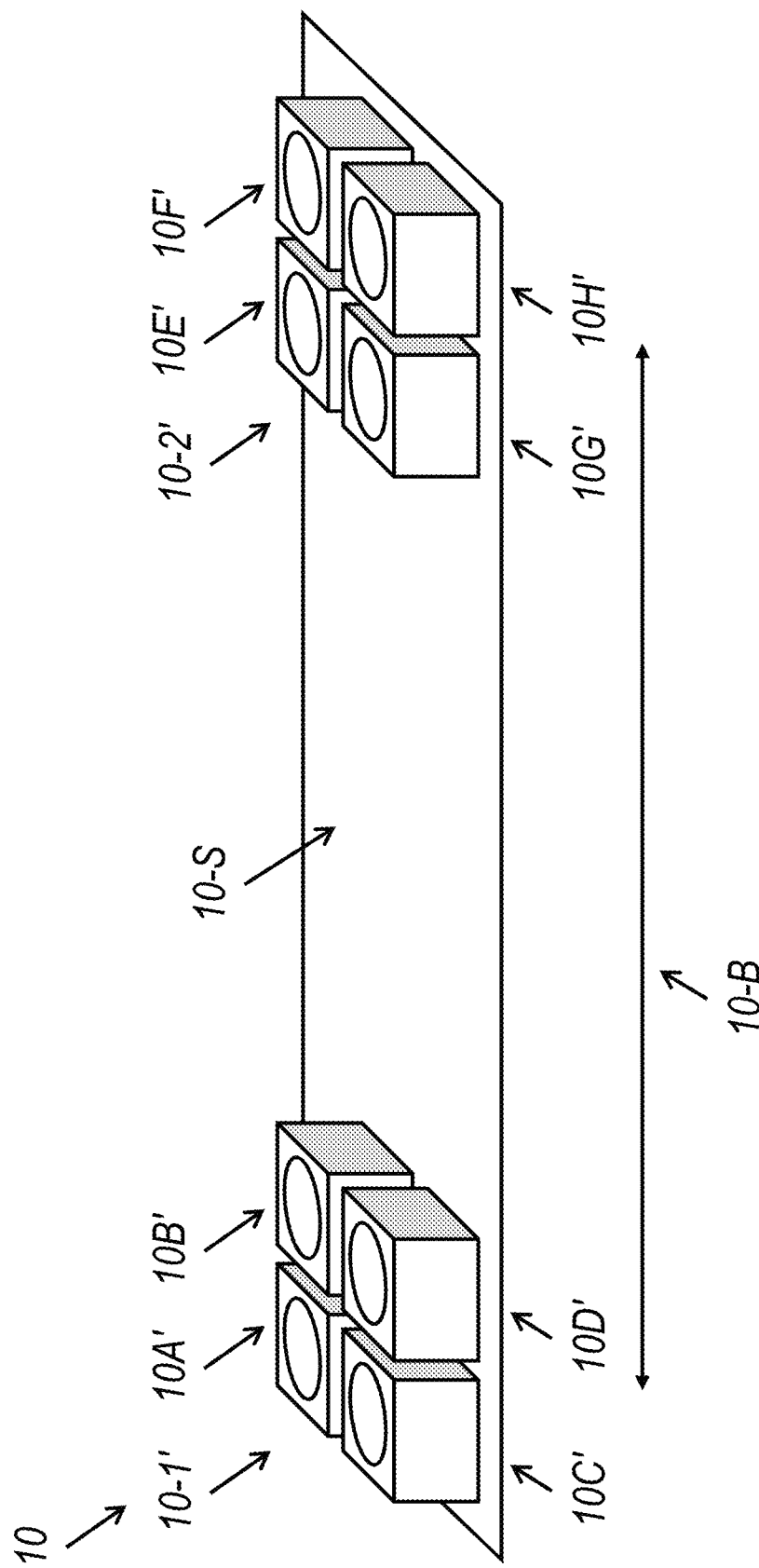
FIG. 2C is a perspective view of a stereo camera array system according to one embodiment of the present disclosure.

FIG. 2C is a perspective view of a stereo camera array system 10 according to one embodiment of the present disclosure. For some applications, stereo vision techniques are used to capture multiple images of scene from different perspectives. As noted above, in some embodiments of the present disclosure, individual cameras (or camera modules) within a camera array 10' are placed adjacent to one another such that parallax shifts between the cameras are small or substantially negligible based on the designed operating distance of the camera system to the subjects being imaged (e.g., where the parallax shifts between cameras of a same array are less than a pixel for objects at the operating distance). In addition, as noted above, in some embodiments, differences in the poses of the individual cameras within a camera array 10' are corrected through image registration based on the calibrations (e.g., computed intrinsic and extrinsic parameters) of the cameras such that the images are aligned to a same coordinate system for the viewpoint of the camera array.

In stereo camera array systems according to some embodiments, the camera arrays are spaced apart from one another such that parallax shifts between the viewpoints corresponding to the camera arrays are detectable for objects in the designed operating distance of the camera system. This enables the distances to various surfaces in a scene (the "depth") to be detected in accordance with a disparity measure or a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 2C depicts a stereo camera array system 10 having a first camera array 10-1' and a second camera array 10-2' having substantially parallel optical axes and spaced apart along a baseline 10-B. In the embodiments shown in FIG. 2C, the first camera array 10-1' includes cameras 10A', 10B', 10C', and 10D' arranged in a 2×2 array similar to that shown in FIG. 2A and FIG. 2B. Likewise, the second camera array 10-2' includes cameras 10E', 10F', 10G', and 10H' arranged in a 2×2 array, and the overall stereo camera array system 10 includes eight individual cameras (e.g., eight separate image sensors behind eight separate lenses). In some embodiments of the present disclosure, corresponding cameras of the camera arrays 10-1' and 10-2' are of the same type or, in other words, configured to capture raw frames or images using substantially the same imaging modalities or in substantially the same spectra. In the specific embodiment shown in FIG. 2C, cameras 10A' and 10E' may be of a same first type, cameras 10B' and 10F' may be of a same second type, cameras 10C' and 10G' may be of a same third type, and cameras 10D' and 10H' may be of a same fourth type. For example, cameras 10A' and 10E' may both have linear polarizing filters at a same angle of 0°, cameras 10B' and 10F' may both have linear polarizing filters at a same angle of 45°, cameras 10C' and 10G' may both be viewpoint-independent cameras having no polarization filter (NF), such as near-infrared cameras, and cameras 10D' and 10H' may both have linear polarizing filters at a same angle of 90°. As another example, cameras 10A' and 10E' may both be viewpoint-independent cameras such as visible light cameras without polarization filters, cameras 10B' and 10F' may both be thermal cameras, cameras 10C' and 10G' may both have polarization masks with a mosaic pattern polarization filters at different angles of polarization (e.g., a repeating pattern with polarization angles of 0°, 45°, 90°, and 135°), and cameras 10D' and 10H' may both be thermal (LWIR) cameras.

While some embodiments are described above wherein each array includes cameras of different types in a same arrangement, embodiments of the present disclosure are not limited thereto. For example, in some embodiments, the arrangements of cameras within a camera array are mirrored along an axis perpendicular to the baseline 10-B. For example, cameras 10A' and 10F' may be of a same first type, cameras 10B' and 10E' may be of a same second type, cameras 10C' and 10H' may be of a same third type, and cameras 10D' and 10G' may be of a same fourth type.

In a manner similar to that described for calibrating or registering cameras within a camera array, the various polarization camera arrays of a stereo camera array system may also be registered with one another by capturing multiple images of calibration targets and computing intrinsic and extrinsic parameters for the various camera arrays. The camera arrays of a stereo camera array system 10 may be rigidly attached to a common rigid support structure 10-S in order to keep their relative poses substantially fixed (e.g., to reduce the need for recalibration to recompute their extrinsic parameters). The baseline 10-B between camera arrays is configurable in the sense that the distance between the camera arrays may be tailored based on a desired or expected operating distance to objects in a scene—when the operating distance is large, the baseline 10-B or spacing between the camera arrays may be longer, whereas the baseline 10-B or spacing between the camera arrays may be shorter (thereby allowing a more compact stereo camera array system) when the operating distance is smaller.

As noted above with respect to FIG. 1B, a light ray 43 hitting the image sensor 14 of a polarization camera 10 has three measurable components: the intensity of light (intensity image/I), the percentage or proportion of light that is linearly polarized (degree of linear polarization/DOLP/ρ), and the direction of that linear polarization (angle of linear polarization/AOLP/ϕ).

Measuring intensity I, DOLP ρ, and AOLP ϕ at each pixel requires 3 or more polarization raw frames of a scene taken behind polarizing filters (or polarizers) at different angles, $\phi_p$ (e.g., because there are three unknown values to be determined: intensity I, DOLP ρ, and AOLP ϕ. For example, a polarization camera such as those described above with respect to FIGS. 1B, 1C, 1D, and 1E captures polarization raw frames with four different polarization angles $\phi_{pol}$, e.g., 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$.

The relationship between $I_{\phi_{pol}}$ and intensity I, DOLP ρ, and AOLP ϕ at each pixel can be expressed as:

$$I_{\phi_{pol}} = I(1 + \rho \cos(2(\phi - \phi_{pol}))) \qquad (7)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP ρ, and AOLP ϕ.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the $\phi$ and $\rho$ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (8)$$

$$\phi = \theta_a \quad (9)$$

and when the specular reflection is dominant:

$$\rho = \frac{2\sin^2\theta_z\cos\theta_z\sqrt{n^2 - \sin^2\theta_z}}{n^2 - \sin^2\theta_z - n^2\sin^2\theta_z + 2\sin^4\theta_z} \quad (10)$$

$$\phi = \theta_a - \frac{\pi}{2} \quad (11)$$

Note that in both cases $\rho$ increases exponentially as $\theta_z$ increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization cameras among the main camera 10 and the support cameras 30. Computing these gradients produces a gradient map (or slope map or surface normals map) identifying the slope of the surface depicted at each pixel in the gradient map. These gradient maps can then be used when estimating the pose of the object by aligning a pre-existing 3-D model (e.g., CAD model) of the object with the measured surface normals (gradients or slopes) of the object in based on the slopes of the surfaces of the 3-D model, as described in more detail below.

Estimating Six-Degree-of-Freedom Poses of Objects in a Scene

Estimating the six-degree-of-freedom (6-DoF) poses of objects in a scene is a useful task in various applications such as robotics, where understanding the three-dimensional (3-D) shapes and locations of objects in a scene provides more information to a robot controller regarding an environment, thereby improving situational awareness and enabling the robot controller to interact appropriately with the environment, in accordance the particular tasks assigned to the robot. As noted above, autonomously navigating robots or vehicles may maintain information about the poses of objects in a scene in order to assist with navigation around those objects in order to predict trajectories and to avoid collisions with those objects. As another example, in the case of manufacturing, pose estimation may be used by robotic systems to manipulate the workpieces and place and/or attach components to those workpieces.

Some aspects of systems and methods for estimating the six-degree-of-freedom poses of objects are described in International Patent Application No. PCT/US21/15926, titled "SYSTEMS AND METHODS FOR POSE DETECTION AND MEASUREMENT," filed in the United States Patent and Trademark Office on Jan. 29, 2021, the entire disclosure of which is incorporated by reference herein. Generally, the approach described in the above-referenced international patent application relate to computing a 6-DoF pose of an object in a scene by determining a class or type of the object (e.g., a known or expected object) and aligning a corresponding 3-D model of the object (e.g., a canonical or ideal version of the object based on known design specifications of the object and/or based on the combination of a collection of samples of the object) with the various views of the object, as captured from different viewpoints around the object.

In some environments, the poses of a scene containing a plurality of rigid objects can be determined based on a single 3-D model for each type of object in the scene. For example, the scene may include a single type or class of object (such as a single type of rigid metal bracket) or a combination of different types or classes of rigid objects (e.g., a first class of rigid metal brackets and a second class of metal screws, where the metal screws may be threaded through corresponding screw holes in the metal bracket). Each type of object (e.g., the metal bracket and the metal screws) may be represented by a corresponding canonical 3-D model. Because all such rigid objects are expected or assumed to have substantially the same shape (e.g., manufacturing quality control procedures have removed most or all malformed or damaged components), and therefore these canonical 3-D models are expected to match the configuration of the objects observed in the scene with high accuracy. However, in the case of objects that are deformable (e.g., non-rigid), the objects of a particular type or class may be observed in of a wide range of different configurations. Therefore, a single rigid 3-D model may be insufficient to accurately represent the pose and configuration of object in the scene. For example, a flex circuit (or flexible printed circuit board) may have any of a wide range of potential configurations, where the circuit may be flat, curved, twisted, tangled with other flex circuits, and/or the like. A single rigid 3-D model of the flex circuit may depict that component in only a single configuration (e.g., flat), which makes it difficult or impossible to accurately align the pose of the 3-D model to the observed pose of the flex circuit in the scene which may have a physical configuration other than a flat configuration, due to twists and bends in the flexible portion. In addition, the configuration or shape of the deformable object may change dynamically over time as the deformable object interacts with other objects in the scene. For example, lifting a flexible printed circuit board by one connector, can cause the other parts of the flex circuit to bend and/or twist under the influence of gravity. Furthermore, a robotic system may need to manipulate the flex circuit to remove (or create) twists before connecting the flex circuit to a workpiece.

Therefore, aspects of embodiments of the present disclosure relate to additional techniques for computing the 6-DoF poses of deformable objects. For the sake of convenience, aspects of embodiments of the present disclosure will be described in the context of detecting the 6-DoF poses of flex circuits (or flexible printed circuit boards), but embodiments of the present disclosure are not limited thereto, and may be applied to any of a wide range of deformable objects such as objects that include one or more continuously pivotable joints and objects (e.g., a hinge or other object including multiple rigid components with pliable connections therebetween), objects that have at least some portions that are continuously pliable (e.g., a cloth, a rope or string, wires and cables, flexible tubing, soft rubber parts, a bag or other pliable container containing rigid or soft objects and/or fluids, foam packing materials, or the like) and objects that are pliable and that retain their shapes after being bent into various shapes (e.g., metal wires, metal sheets or foil).

Figure 3:
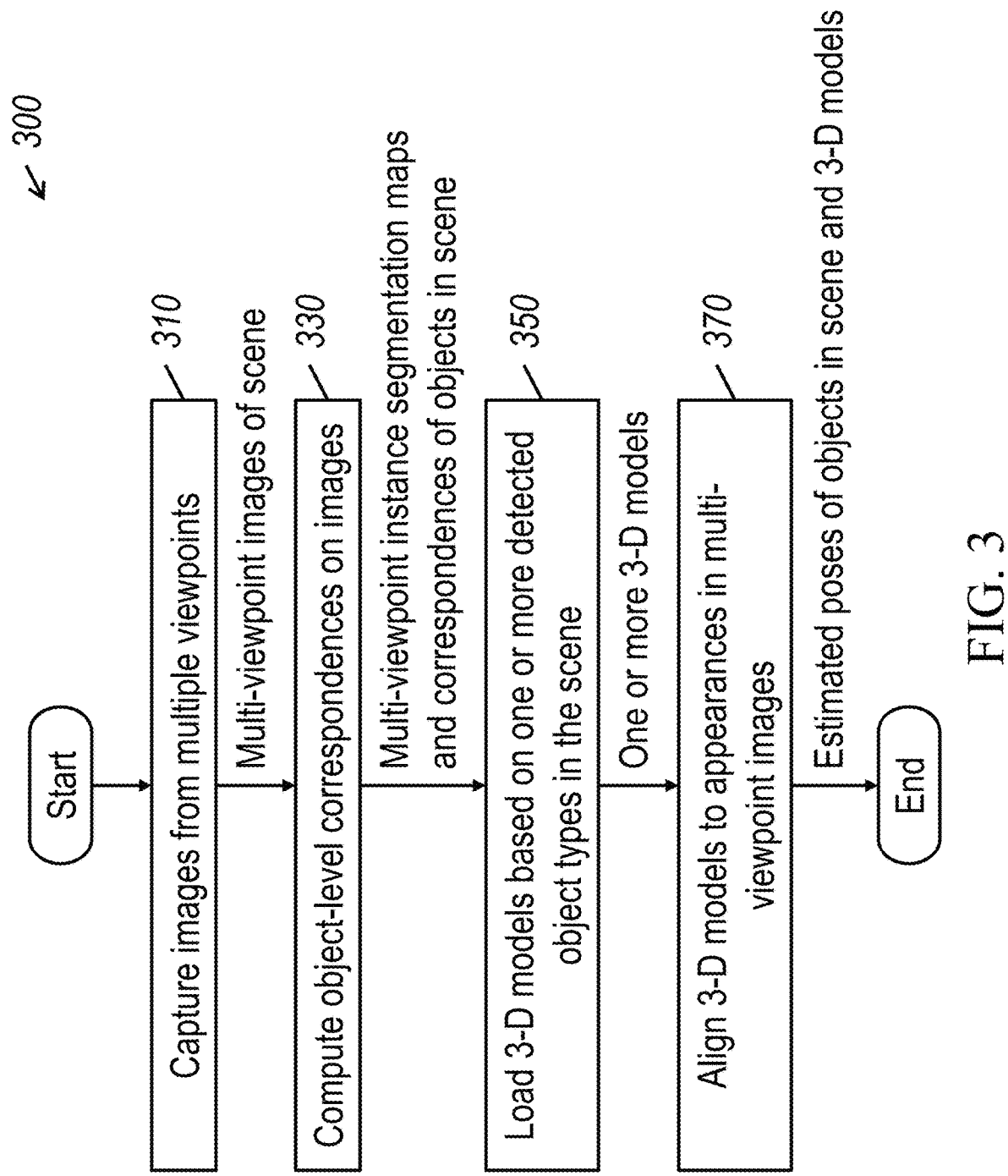
FIG. 3 is a flowchart depicting a general pipeline for computing six-degree-of-freedom (6-DoF) poses of objects, including deformable objects, according to some embodiments of the present disclosure.

FIG. 3 is a flowchart depicting a method for computing six-degree-of-freedom (6-DoF) poses of objects, including deformable objects, according to some embodiments of the present disclosure.

In operation 310, the pose estimator 100 controls a plurality of cameras, such as the master camera 10 and the support cameras 30, to capture images of the scene from multiple viewpoints. In some embodiments, the cameras are configured to capture images concurrently or substantially simultaneously. Each camera is arranged at a different pose with respect to the scene 1, such that each camera captures scene from its corresponding different viewpoint. Accordingly, the collection of images captured by the cameras represent a collection of multi-viewpoint images of the scene 1. (In some embodiments, the images are captured from multiple viewpoints using one or more cameras, such as by moving the one or more cameras between different viewpoints while keeping the scene fixed, and/or rigidly transforming the scene between captures by the one or more cameras.)

In some circumstances, one or more of the "cameras" are multi-modal cameras that capture multiple images from the same viewpoint, but having in different modalities, such as different portions of the electromagnetic spectrum (e.g., red, green and blue portions of the visible light spectrum, near infrared light, far infrared light, ultraviolet light, etc.), different optical filters (e.g., linear polarization filters at different angles and/or circular polarization filters), and combinations thereof. Accordingly, a collection of multi-viewpoint images of a scene does not require that all images be captured from different viewpoints, but only that there are at least two images captured from different viewpoints. Such a collection of multi-viewpoint images therefore may include at least some images that are captured from the same viewpoint.

In operation 330, the pose estimator 100 computes object-level correspondences on the multi-viewpoint images of the scene. More specifically, instances of one or more types of objects are identified in the multi-viewpoint images of the scene, and corresponding instances of objects are identified between the multi-viewpoint images. For example, a scene 1 may include two cubes and three spheres, and various of the multi-viewpoint images may depict some or all of these five objects. A process of instance segmentation identifies the pixels in each of the images that depict the five objects, in addition to labeling them separately based on the type or class of object (e.g., a classification as a "sphere" or a "cube") as well as instance labels (e.g., assigning a unique label to each of the objects, such as numerical labels "1," "2," "3," "4," and "5"). Computing object-level correspondences between the multi-viewpoint images further relates to computing consistent labels between the different viewpoints (for example, such that the same cube is labeled "1" from each of the viewpoint).

Systems and methods for computing object-level correspondences are described in International Patent Application No. PCT/US21/15926, titled "SYSTEMS AND METHODS FOR POSE DETECTION AND MEASUREMENT," filed in the United States Patent and Trademark Office on Jan. 29, 2021, which, as noted above, is incorporated by reference herein in its entirety. For the sake of clarity, some techniques for computing object-level correspondences on images are described herein with reference to FIGS. 4A, 4B, and 4C.

In general terms, embodiments of the present disclosure are directed to reducing a search space for conducting image processing tasks such as, for example, pixel-level correspondence. In one embodiment, instance segmentation is performed to identify different instances of objects in images portraying a scene as viewed from different viewpoints, and instance segmentation maps/masks may be generated in response to the instance segmentation operation. The instance segmentation masks may then be employed for computing object level correspondences.

In one embodiment, object level correspondence allows the matching of a first instance of an object appearing in a first image that depicts a view of a scene from a first viewpoint, to a second instance of the same object appearing in a second image that depicts a view of a scene from a second viewpoint. Once object level correspondence is performed, the search space for performing, for example, pixel-level correspondence, may be limited to the regions of the image that correspond to the same object. Reducing the search space in this manner may result in faster processing of pixel-level correspondence and other similar tasks.

Figure 4A:
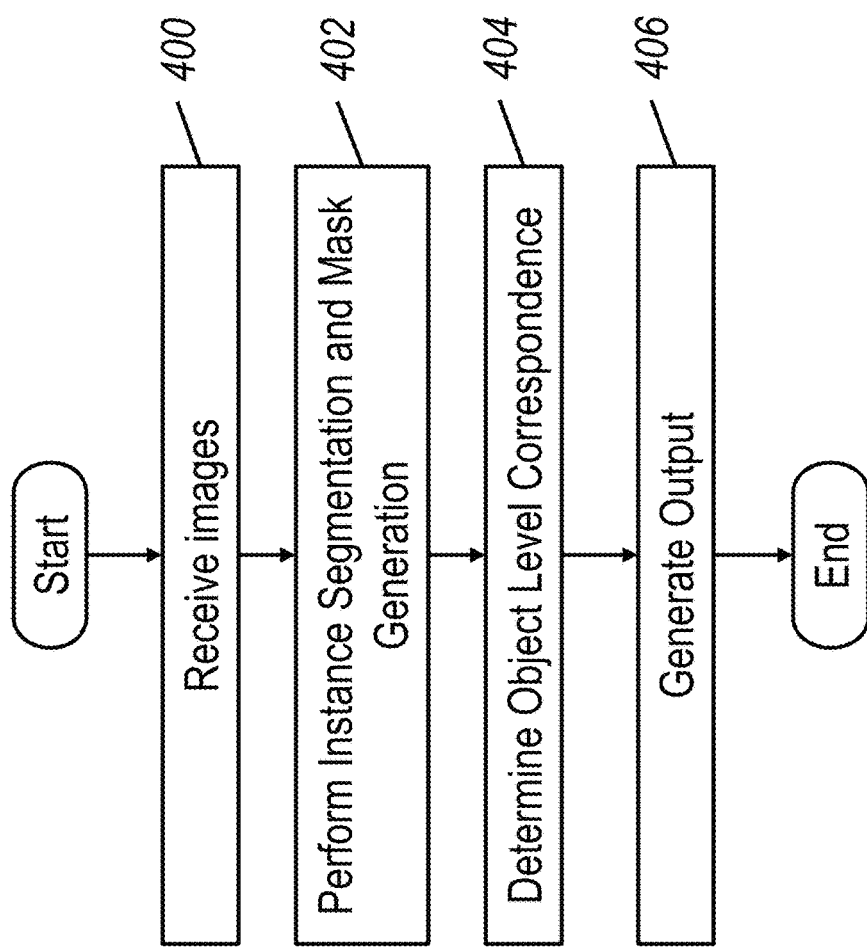
FIG. 4A is a flow diagram of a process for object level correspondence according to one embodiment.

FIG. 4A is a flow diagram of a process for object level correspondence according to one embodiment. The process may be implemented by one or more processing circuits or electronic circuits that are components of the pose estimator 100. It should be understood that the sequence of steps of the process is not fixed, but can be modified, changed in order, performed differently, performed sequentially, concurrently, or simultaneously, or altered into any desired sequence, as recognized by a person of skill in the art. The process described with respect to FIG. 4A may be used, in some embodiments of the present disclosure, to compute object level correspondences in operation 330 of FIG. 3, but embodiments of the present disclosure are not limited thereto.

The process starts, and at block 400, the pose estimator 100 receives multi-view images from the main and support cameras 10, 30. A first image captured by one of the cameras may depict one or more objects in a scene from a first viewpoint, and a second image captured by a second camera may depict the one or more objects in the scene from a second viewpoint different from the first viewpoint. The images captured by the cameras may be, for example, polarized images and/or images that have not undergone any polarization filtering.

At block 402 the pose estimator 100 performs instance segmentation and mask generation based on the captured images. In this regard, the pose estimator 100 classifies various regions (e.g. pixels) of an image captured by a particular camera 10, 30 as belonging to particular classes of objects. Each of the different instances of the objects in the image may also be identified, and unique labels be applied to each of the different instances of objects, such as by separately labeling each object in the image with a different identifier.

In one embodiment, segmentation masks delineating the various object instances are also be generated. Each segmentation mask may be a 2-D image having the same dimensions as the input image, where the value of each pixel may correspond to a label (e.g. a particular instance of the object depicted by the pixel). A different segmentation mask may be generated for different images depicting different viewpoints of the objects of interest. For example, a first segmentation mask may be generated to depict object instances in a first image captured by a first camera, and a second segmentation mask may be generated to depict object instances in a second image captured by a second camera. As convolutional neural network such as, for example, Mask R-CNN, may be employed for generating the segmentation masks.

At block 404, the pose estimator 100 engages in object-level correspondence of the objects identified in the segmentation masks. In this regard, the pose estimator may invoke a matching algorithm to identify a segmented instance of a particular object in one image as corresponding (or matching) a segmented instance of the same object in another image. The matching algorithm may be constrained to search for matching object instances along an epipolar line through an object instance in one image to find a corresponding object instance in a different image. In one embodiment, the matching algorithm compares different features of the regions corresponding to the segmented object instances to estimate the object correspondence. The matching of object instances from one image to another may narrow a search space for other image processing tasks such as, for example, performing pixel level correspondence or keypoint correspondence. The search space may be narrowed to the identified regions of the images that are identified as corresponding to the same object.

At block 406, the pose estimator 100 generates an output based on the object-level correspondence. The output may be, for example, a measure of disparity or an estimated depth (e.g., distance from the cameras 10, 30) of the object based on the disparity between corresponding instances as depicted in the various images. In one embodiment, the output is a three-dimensional reconstruction of the configuration of the object and a 6-DoF pose of the object, as described in more detail below with respect to FIG. 3.

Figure 4B:
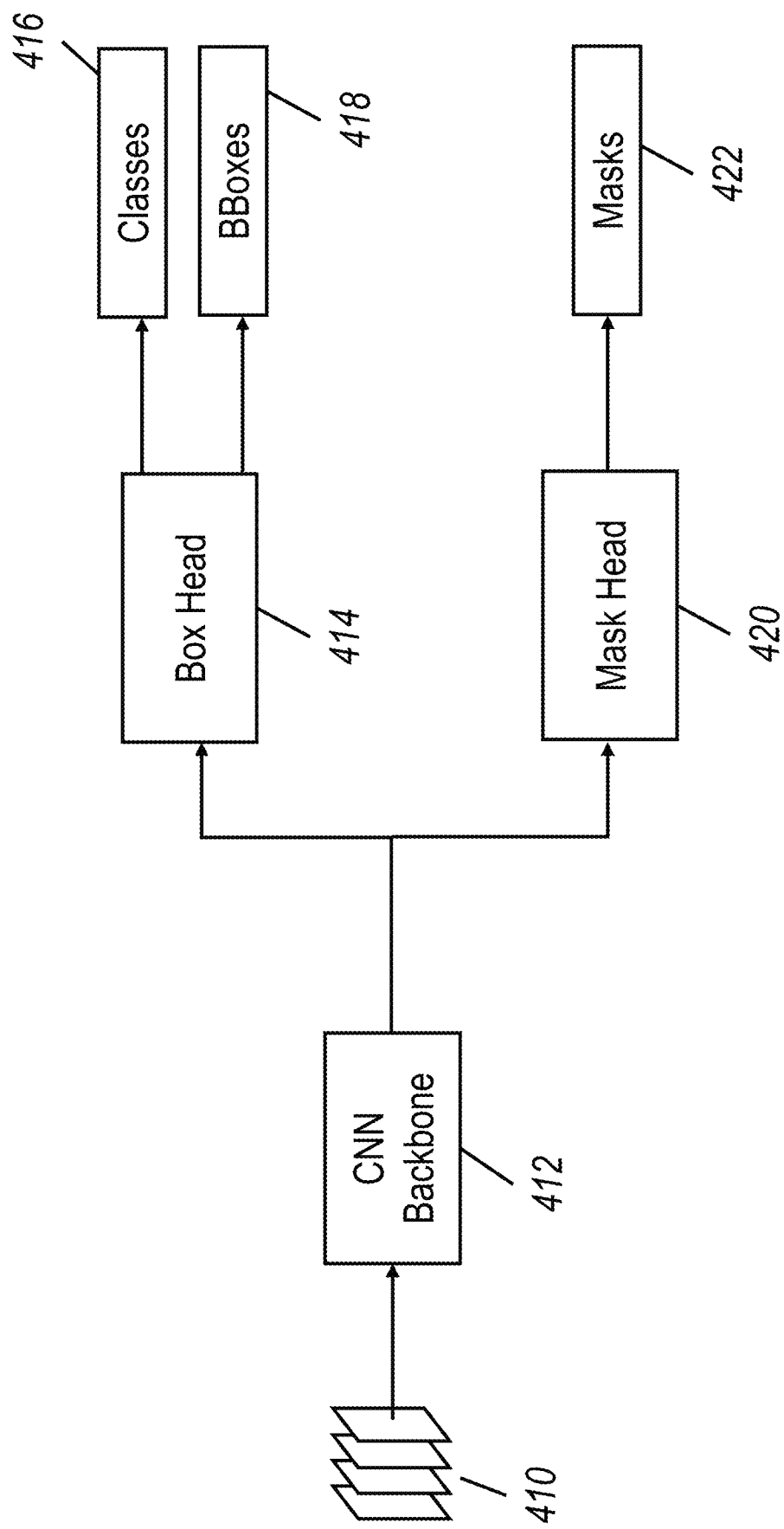
FIG. 4B is a block diagram of an architecture for instance segmentation and mask generation of step according to one embodiment.

FIG. 4B is a block diagram of an architecture for instance segmentation and mask generation of step 402 according to one embodiment. Input images 410 captured by the various cameras 10, 30 are provided to a deep learning network 412 such as, for example, a CNN backbone. In the embodiments where the images include polarized images, the deep learning network may be implemented as a Polarized CNN backbone as described in PCT Patent Application No. PCT/US2020/048604, also filed as U.S. patent application Ser. No. 17/266,046, the content of which is incorporated herein by reference.

In one embodiment, the deep learning network 412 is configured to generate feature maps based on the input images 410, and employ a region proposal network (RPN) to propose regions of interest from the generated feature maps. The proposals by the CNN backbone may be provided to a box head 414 for performing classification and bounding box regression. In one embodiment, the classification outputs a class label 416 for each of the object instances in the input images 410, and the bounding box regression predicts bounding boxes 418 for the classified objects. In one embodiment, a different class label 416 is provided to each instance of an object.

The proposals by the CNN backbone may also be provided to a mask head 420 for generating instance segmentation masks. The mask head 416 may be implemented as a fully convolutional network (FCN). In one embodiment, the mask head 420 is configured to encode a binary mask for each of the object instances in the input images 410.

Figure 4C:
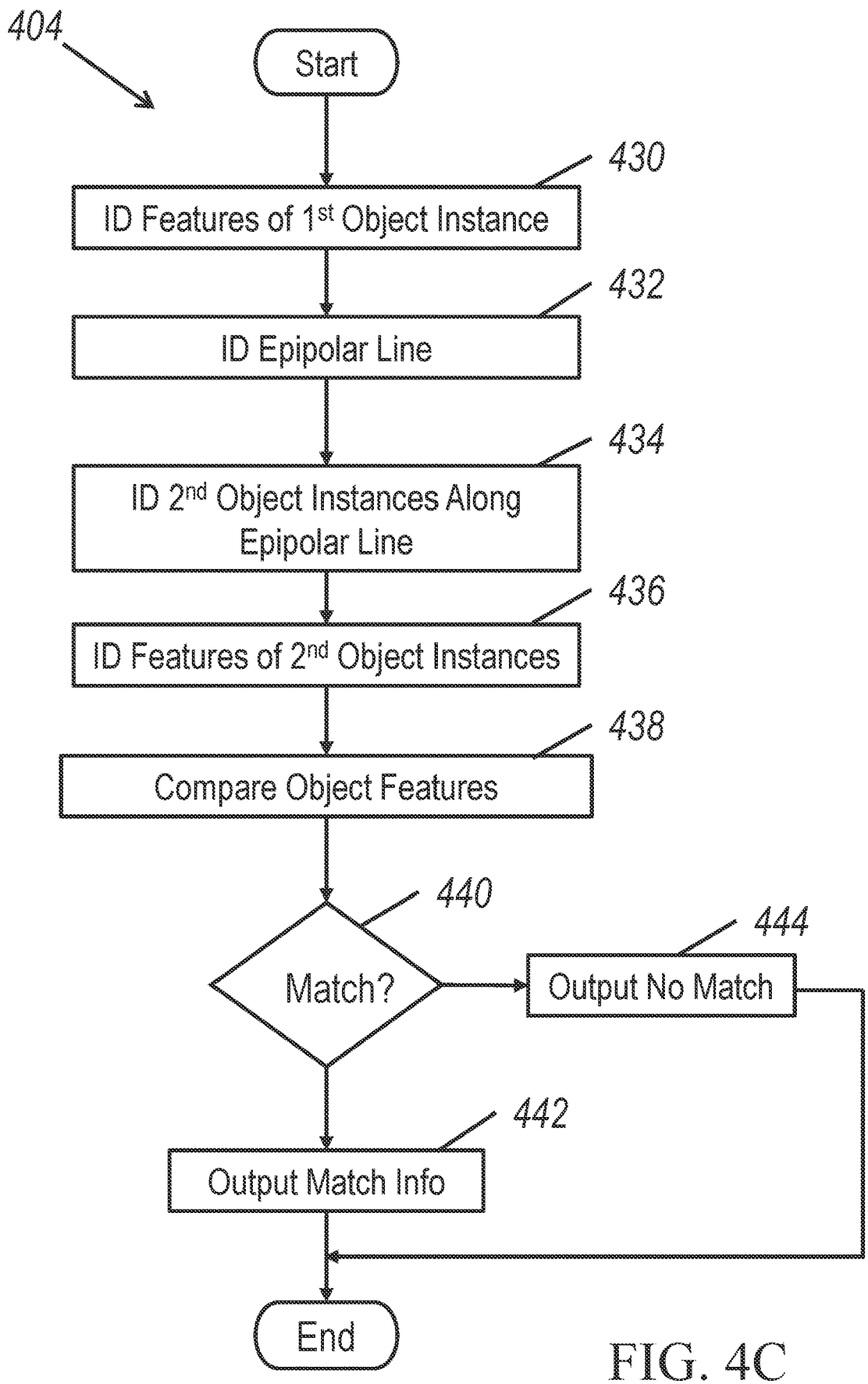
FIG. 4C is a more detailed flow diagram of a matching algorithm employed at step 404 (FIG. 4A) for identifying object-level correspondence for a particular object instance in a first segmentation mask according to one embodiment.

FIG. 4C is a more detailed flow diagram of a matching algorithm employed at step 404 (FIG. 4A) for identifying object-level correspondence for a particular object instance in a first segmentation mask according to one embodiment. The process may repeat for all object instance identified in the first segmentation mask. The sequence of steps of the process of FIG. 4C is not fixed, but can be modified, changed in order, performed differently, performed sequentially, concurrently, or simultaneously, or altered into any desired sequence, as recognized by a person of skill in the art.

At block 430, the matching algorithm identifies features of a first object instance in a first segmentation mask. The identified features for the first object instance may include a shape of the region of the object instance, a feature vector in the region, and/or keypoint predictions in the region. The shape of the region for the first object instance may be represented via a set of points sampled along the contours of the region. Where a feature vector in the region is used as the feature descriptor, the feature vector may be an average deep learning feature vector extracted via a convolutional neural network.

At block 432, the matching algorithm identifies an epipolar line through the first object instance in the first segmentation mask.

At block 434, the matching algorithm identifies one or more second object instances in a second segmentation mask that may correspond to the first object instance. A search for the second object instances may be constrained to the epipolar line between the first segmentation map and the second segmentation map that runs through the first object instance. In one embodiment, the matching algorithm searches approximately along the identified epiploar line to identify object instances in the second segmentation mask having a same class identifier as the first object instance. For example, if the first object instance belongs to a "dog" class, the matching algorithm evaluates object instances in the second segmentation mask that also belong to the "dog" class, and ignores objects that belong to a different class (e.g., a "cat" class).

At block 436, the matching algorithm identifies the features of the second object instances that belong the same class. As with the first object instance, the features of a particular second object instance may include a shape of the region of the second object instance, a feature vector representing the region, and/or keypoint predictions in the region.

At block 438, the matching algorithm compares the features of the first object instance to the features of second object instances for determining a match. In one embodiment, the matching algorithm identifies a fit between the features of the first object instance and features of the second object instances for selecting a best fit. In one embodiment, the best fit may be identified via a matching function such as the Hungarian matching function. In one embodiment, the features of the object instances are represented as probability distributions, and the matching function attempts to find a match of the probability distributions that minimizes a Kullback-Leibler (KL) divergence.

At block 440, a determination is made as to whether a match has been found. If the answer is YES, an output is generated at block 442. The output may include, for example, information (e.g. object ID) of the second object instance that matched the first object instance.

If the answer is NO, an output may be generate indicating a match failure at block 444.

Accordingly, object level correspondences can be computed from the multi-viewpoint images. These object level correspondences may be used to extract corresponding crops or patches from the multi-viewpoint images, where each of these crops or patches depicts a single instance of an object, and collections of corresponding crops or patches depict the same instance of an object from multiple viewpoints.

In operation 350, the pose estimator 100 loads a 3-D model of the object based on the detected object type one or more object detected in the scene (e.g., for each detected instance of a type of object). For example, in a circumstance where the collection of objects 22 includes a mixture of different types of flexible printed circuit boards, the process of computing object-level correspondences assigns both an instance identifier and a type (or classification) to each detected instance of a flexible printed circuit board (e.g., which of the different types of printed circuit boards). Therefore, a 3-D model of the object may then be loaded from a library based on the detected object type.

In operation 370, the pose estimator 100 aligns the corresponding 3-D model to the appearances of the object to be consistent with the appearance of the object as seen from the different multiple viewpoints. The alignment process in operation 370 may also include deforming the 3-D model to match the estimated configuration of the actual object in the scene. This alignment of the 3-D model provides the 6-DoF pose of the object in a global coordinate system (e.g., a coordinate system based on the main camera 10 or based on the robot controller 28).

Various techniques for loading an appropriate model from a library in accordance with operation 350 and aligning the loaded model in accordance with operation 370 will be described in more detail below. In embodiments of the present disclosure, the various techniques described below may be used independently or in combination, such as by supplying a 3-D mesh model output from one technique as an input 3-D mesh model of another technique. In addition, some aspects of embodiments of the present disclosure relate to selecting between different techniques based on detected characteristics of objects in the scene and applying the selected techniques to computing a 6-DoF pose of an object.

Generally, the methods described herein will make use of a 3-D model or computer-aided-design (CAD) model C of the object (e.g., as loaded in operation 350) and two-dimensional (2-D) image data I of the object (e.g., as captured by the cameras in operation 310 and with object-level corresponding patches of the images extracted therefrom in operation 330). In some embodiments, the output of the 6-DoF pose estimation technique (computed by the pose estimator 100) includes a mesh M and its 6-DoF pose a global coordinate system (e.g., 3 dimensional translational and rotational coordinates in the coordinate system used by the controller 28 of a robotic arm 24 or a coordinate system oriented with respect to a master camera 10) for each of the detected objects in the scene.

Figure 5:
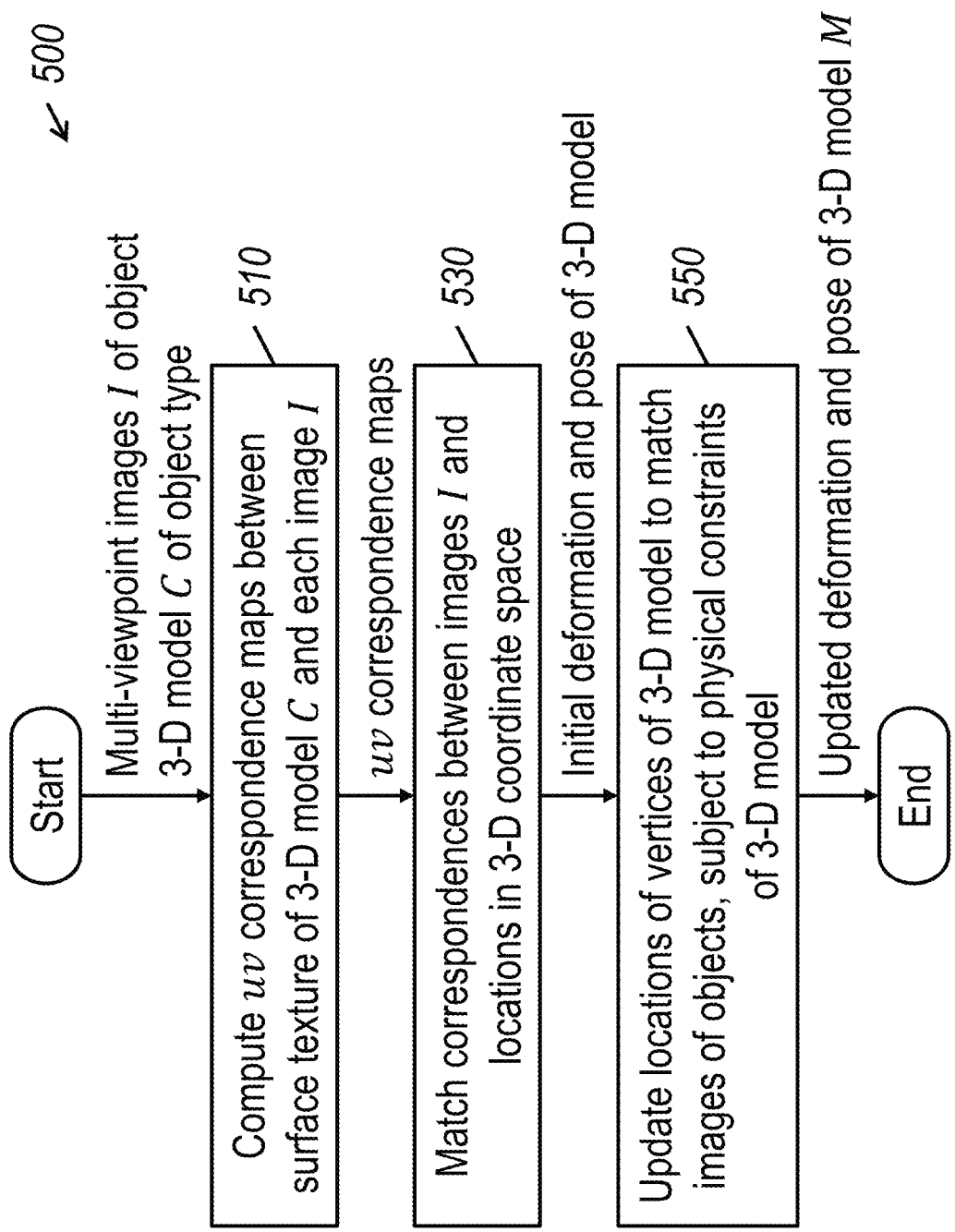
FIG. 5 is a flowchart depicting a method for computing 6-DoF poses of objects based on the appearance of object surface texture using multiple viewpoints reconstruction according to some embodiments of the present disclosure.

FIG. 5 is a flowchart depicting a method 500 for computing 6-DoF poses of objects based on the appearance of object surface texture using multiple viewpoints reconstruction according to some embodiments of the present disclosure. In some circumstances, the pose estimator 100 estimates the poses of deformable objects 22 having distinct surface textures (textures in the sense of color and other aspects controlling the appearance of a surface, as opposed to being limited to three-dimensional surface roughness or indentations, which may also affect the visual appearance of the surface). For example, a flexible printed circuit board may have visible texture in the form of screen-printed markings and labels (e.g., labeling pins and numbers for various components) and may also have visible electrical traces that connect various electronic components that are mounted on the flexible printed circuit board (e.g., wires that electrically connect different connectors on the flexible printed circuit board). As another example, a commercial product may be wrapped in standardized printed packaging, more concretely, a particular type of candy may be wrapped in a particular type of plastic film, where the film has a printed color texture (e.g., logos for the candy and the brand, pictures of the product, nutrition information, ingredients list, and the like). The shapes of these packaged food products may be inconsistent from one instance to the next, or even as a single instance is manipulated and moved, because the packaging may not tightly conform to the shape of the product contained therein, because of variation in the shape of the product, and/or because the product may be loose within the packaging (e.g., in the case of a bag of loose candy such as jelly beans or a bag of peanuts), thereby resulting in the configuration of the object, and the shape of its outer surface, to change as the object is moved around. Similar issues may occur with other packaged goods, such as refill packages for liquid soaps and detergents and shrink wrapped packages of paper products.

Accordingly, some aspects of embodiments of the present disclosure relate to using the known or expected visible surface texture associated with a particular type or class of object to estimate the deformation of the instance of the object observed in the scene 1.

In more detail, in operation 350, a 3-D model associated with the type of object is loaded from a library of models. For example, when the object instance is classified as a particular type of printed circuit board, a 3-D model of the printed circuit board is loaded from the library of models. As another example, when the object instance is a classified as a particular size and variety of candy bar, a 3-D model of that type of candy bar is loaded from the library of models. In various embodiments of the present disclosure, the library of 3-D models stores at least one 3-D model (e.g., 3-D mesh model) for each type of object, where the 3-D model also includes a surface texture (e.g., a 2-D image) mapped onto the surface of the 3-D model in a uv coordinate space.

In operation 510, for each of the n images $I_n$ of the same object instance from different viewpoints, the pose estimator 100 computes or predicts a uv correspondence map. Each uv correspondence map is a dense correspondence between pixels of the image and points on the surface of the CAD model C. In some embodiments, the correspondence map is computed using a trained neural network, such as a neural network trained specifically for a particular type of object having a particular surface texture (e.g., a particular piece of packaging having a particular printed design). In particular, in some embodiments, the input to such a trained neural network is an image of the object from one viewpoint, and the output of the network is the uv correspondence map for that viewpoint, where the correspondence map identifies locations or coordinates in the surface texture in uv coordinate space (e.g., a coordinate space with respect to the surface texture or the surface of the 3-D model C). In some embodiments, the correspondences are detected based on detecting keypoints on the surface of the object and identifying the corresponding locations of keypoints in the surface texture of the 3-D model in uv coordinate space.

In operation 530, the pose estimator 100 matches the dense correspondences from the uv correspondence map and the position of the points in 3-D space. In particular, for each of the images, the camera pose in a global coordinate system is known. Accordingly, the pose estimator 100 triangulates the 3-D locations of corresponding points seen in multiple images based on the known poses of the cameras that captured the images and based on, for example, projective reconstruction through epipolar geometry. These computed 3-D locations of corresponding points that appear in the different images generates a point cloud that partly defines the surface shape of resulting mesh M where it is visible to the cameras. In addition, the corresponding points of the surface texture of the 3-D model can be mapped to the point cloud to generate a partial 3-D model, where the pose of the partial 3-D model may be updated to minimize a difference (e.g., as represented by a loss function) between the current estimated pose of the 3-D model and the images.

In operation 550, the pose estimator 100 updates the locations or positions of vertices of the 3-D model to reconstruct the remainder of the model. For example, in some embodiments, the pose estimator 100 performs a physical simulation with additional specific constraints based on the object class. As one example of a constraint, when predicting or estimating the pose of a sealed bag (e.g., containing a liquid or granular product), the sealed bags may have a known, consistent fill volume, and therefore the fixed volume of the bag acts as a constraint that limits the possible shapes (e.g., positions of the vertices) of portions of the object that are not depicted in the images (e.g., portions that are not visible or invisible to the cameras due to, for example, occlusion). Performing such a simulation subject to constraints reduces the search space for minimizing or optimizing a loss function to update the locations of the vertices of the 3-D model to match the images I of the object.

In some embodiments, a loss function E is defined as follows:

$$E = E_1 + E_2 \quad (12)$$

$$E_1 = \sum_{n=1}^{N} \|R_n(M) - I_n\|_2 \quad (13)$$

$$E_2 = \sum_{n=1}^{N} 1 - \|S_{pn} \otimes S_n\|_1 / \|S_{pn} \oplus S_n - S_{pn} \otimes S_n\|_1 \quad (14)$$

where $I_n$ is an image from viewpoint n among N viewpoints, $R_n(M)$ is a (2-D) render of mesh (or 3-D model) M from viewpoint n, the mesh M is a function of translation (t) and rotation (r) parameters accordingly, and $\|\cdot\|_2$ indicates an $L_2$-norm. (In some embodiments, the mesh M is also a function of the positions of the vertices of the mesh model M.) $S_{pn}$ and $S_n$ are silhouettes of the object as they appear in the render $R_n(M)$ and the real image $I_n$ accordingly, and these silhouettes may be interpreted as binary images (e.g., having a value of 1 at pixel locations belonging to the object and having a value of 0 at pixel locations that do not belong to the object). The $\otimes$ operator is a pixel-wise (or element-wise) product operator, the $\oplus$ operator is a pixel-wise (or element-wise) addition operator, and $\|\cdot\|_1$ indicates an $L_1$-norm. The $E_1$ component in Equation (13) of the loss function E in Equation (12) may be interpreted as a pixel level differences between the appearance of the object in the renderings, in accordance with the current mesh position, versus the real images captured by the cameras. The $E_2$ component in Equation (14) of the loss function E in Equation (12) may be interpreted as an intersection-over-union (IOU) loss, measuring the alignment of the silhouette of model M with the silhouette of the object as it appears in the images I.

In some embodiments of the present disclosure, one or more of the cameras (e.g., the master camera 10 and/or the support cameras 30) may include polarization cameras configured to capture polarization raw frames of objects. In some embodiments, the pose estimator 100 is configured to compute the surface normals of surfaces in a scene based on shape from polarization (SfP) techniques, as described above. Accordingly, in some embodiments of the present disclosure, the loss function E further accounts for differences in the surface normals in a rendering of a 3-D model versus surface normals as computed based on the polarization raw frames using SfP. For example, in some embodiments, Equation (12) is modified to further include a term $E_3$ relating to differences in surface normals. In some embodiments of the present disclosure, the images I include surface normals maps, where each pixel corresponds to the slope of the surface depicted at that pixel (as computed based on the polarization raw frames and SfP), and a corresponding rendering R(M) is a normals map identifying a computed the slope of the surface of the 3-D model of the object at each pixel, as viewed from the pose of the n-th camera and as the 3-D model is posed in accordance with its parameters (e.g., rotation r and translation t).

Accordingly, computing the locations or positions of the vertices of the 3-D model to match the images I of the object based on identifying correspondences between the images and with the surface texture of the 3-D model generates an updated deformation and pose of a 3-D model M in a global coordinate space, which is output by the pose estimator 100 as the detected pose of the object.

While embodiments of the present disclosure are described above in the context of textures as observable in images captured by color (e.g., visible light) cameras, embodiments of the present disclosure are not limited thereto, and the techniques described with respect to FIG. 5 may also be applied to images captured by cameras in other modalities, such as polarization cameras (e.g., a camera with a polarization filter), infrared cameras, and the like, where surface texture is observable in those other imaging modalities. For example, polarization imaging may enable the detection of reflective surfaces that produce glare, as well as the detection of transparent surfaces (e.g., a completely transparent bag or a bag having a transparent portions to show the contents of the bag).

Some aspects of embodiments of the present disclosure relate to detecting the 6-DoF poses of deformable objects in general, including the case where some or all of the surface of the deformable objects have little or no distinctive surface texture (e.g., textureless or uniform surface textures or that contain confusing textures such as repeating patterns).

Figure 6:
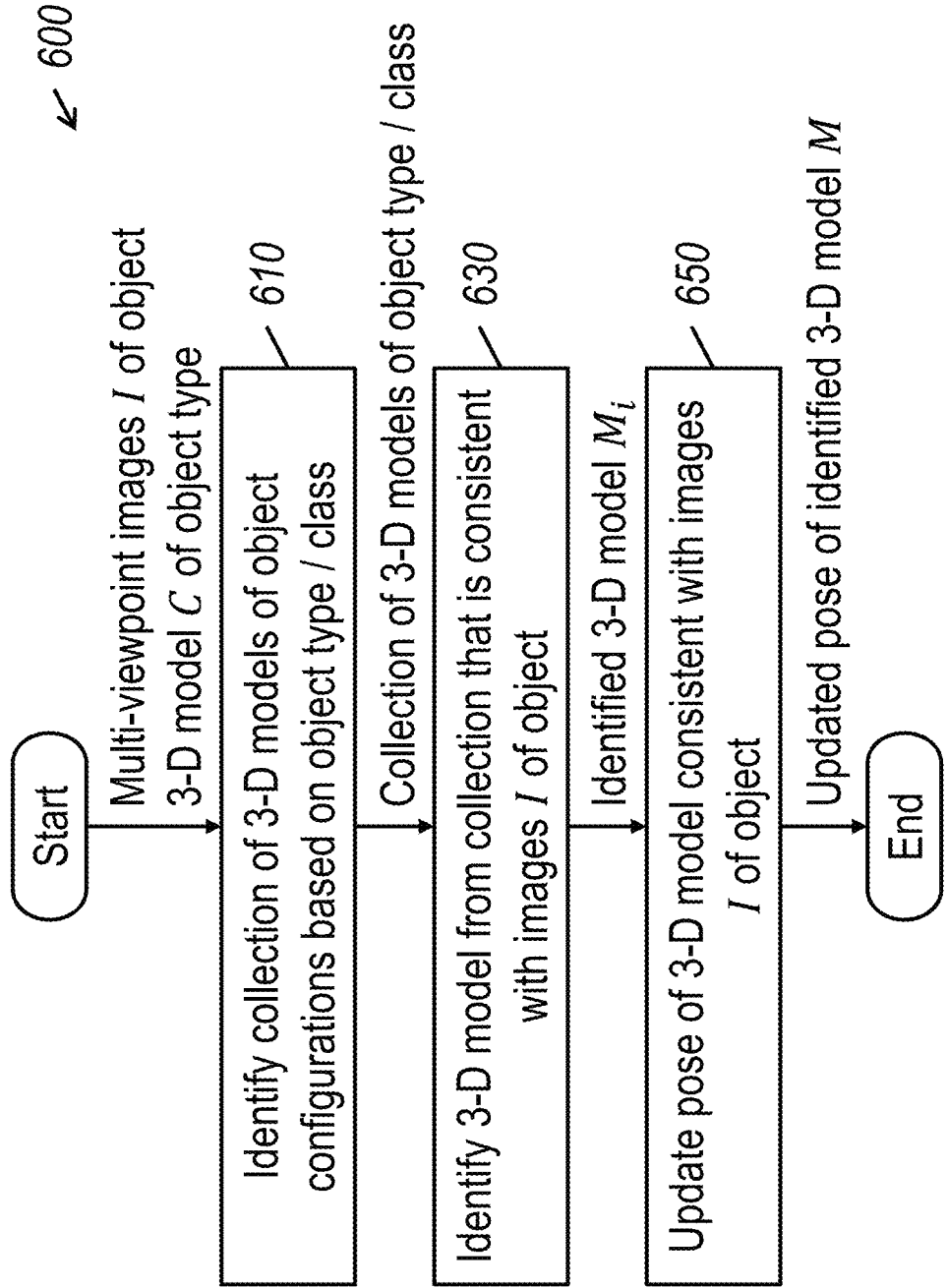
FIG. 6 is a flowchart depicting a method for computing 6-DoF poses of objects based on a library of models of objects according to some embodiments of the present disclosure.

FIG. 6 is a flowchart depicting a method 600 for computing 6-DoF poses of objects based on a library of 3-D models of objects according to some embodiments of the present disclosure. Inputs to the technique 600 shown in FIG. 6 include images I of the object, as extracted by the pose estimator based on identifying object-level correspondences in operation 330 and a type or class of the object depicted in the images, as determined through instance segmentation performed in operation 330.

In operation 610, the pose estimator 100 identifies a collection of 3-D models within the library of 3-D models of objects, where the identified collection of 3-D models includes different 3-D models corresponding to different possible deformations of the same object or same class or type of object. For example, a collection of models for a particular flexible printed circuit board (e.g., representing a class of flexible printed circuit boards that are substantially the same) may correspond to various possible deformations or physical conditions of the flex circuit, such as with various portions of the flex circuit curved and/or twisted in different ways. As another example, a collection of models for a bag of hard candies may correspond to different ways in which the hard candies may be distributed within the bag, as well as various ways in which the bag may be folded, compressed, wrinkled, and the like, subject to physical constraints (e.g., standard fill levels of the bag with respect to both product and air and topological constraints, such as excluding unlikely configurations such as a bag tied into a knot). Details on embodiments for generating collections of models of a type or class of object in various configurations will be described in more detail below. In some embodiments, a collection of 3-D models for a given class or type of object may include on the order of thousands of different 3-D models of the object in different configurations that cover the space of configurations that are most likely to be observed in a scene 1.

In operation 630, the pose estimator 100 searches the collection of 3-D models of the object type for a deformed mesh $M_i$ that most closely matches the shape of the object in the scene as depicted in the images I of the object. In some embodiments, the quality of the match is quantified based on the loss function E defined above with respect to Equation (12).

In some embodiments of the present disclosure, the search is performed using a brute-force search among all of the 3-D models or mesh models in the collection of 3-D models (e.g., computing the loss function for all 3-D models and for some set of rotations r of the model, such as 36 possible rotations along each axis of rotation).

In some embodiments of the present disclosure, a cluster-based search is performed, where the pose estimator 100 evaluates the quality of the match between the images I of the object and several different candidate 3-D models from the collection having very different configurations from one another. After identifying a most similar 3-D model from the candidate 3-D models, a cluster of 3-D models that are similar to the identified, most similar 3-D model is selected (and less similar to any of the other representative 3-D models). The process may then continue by selecting candidate models that are different from one another within the current cluster of 3-D models, and comparing the images I of the object to the candidate 3-D models of the cluster, and iteratively identifying smaller clusters of models (e.g., clusters of more similar models) until a stopping condition is met, such as when only a single 3-D model remains in a cluster, such as when an iteration limit is reached, or such as where all of the candidate models have the same match quality with respect to the images I of the object (in which case one of the candidate models may be selected randomly).

In some embodiments of the present disclosure, the input images I of the object include one or more depth maps computed from the cameras 10, 30. For example, any of the master camera 10 and/or support cameras 30 may include a stereo camera system that captures stereo pairs of images, where the stereo pairs are used to compute the one or more depth maps (or depth scans) of the object from one or more viewpoints. In some embodiments, these one or more depth maps or depth scans are converted into 3-D point clouds representing the shape of the object. (In some embodiments, 3-D point clouds captured from different viewpoints are merged using, for example, an iterative closest point algorithm, or directly merged by transforming the locations of the points of the point cloud to a common coordinate system based on the known relative poses of the cameras at the different viewpoints.) In some embodiments, the resulting point cloud is used to select a small group of 3-D models (e.g., three to five different 3-D models) from the collection of 3-D models of the object type or class. This selection of 3-D models that match the one or more depth maps may be made using an iterative closest point algorithm to find a best alignment between the point cloud and the various 3-D models of the collection, and to evaluate the quality of the alignment based on a loss function (e.g., a distance from each of the points of the point cloud to the surface of the 3-D model). In some embodiments, the group of 3-D models that match the one or more depth maps is used to perform a further cluster-based search as described above. In some embodiments, the group of 3-D models that match the one or more depth maps are used as candidates updating the poses of each (e.g., iteratively updating the rotation and translation of the 3-D models) to be consistent with all of the images I of the object (e.g., the depth maps as well as other images, such as color images), and a model having a lowest error (e.g., as computed in accordance with the loss function E), is output as the 3-D model M.

According to some embodiments of the present disclosure, the pose estimator 100 selects the 3-D model from the collection of 3-D models and its estimated 6-DoF pose through joint optimization over multiple variables. In some embodiments, these variables include a selection index (selecting a particular 3-D model) and pose. In some embodiments, these variables include differentiable functional variation and pose.

In some embodiments of the present disclosure, a machine learning model such as a neural network, is trained to classify objects as depicted in the images I of the object to identify meshes that are most similar to the meshes in the collection to select a set of the most probable (e.g., most similar) meshes to try. Such a machine learning model may be referred to herein as a trained deformation classifier. For example, the output of the trained deformation classifier may be a vector having a length equal to the number of different 3-D models in the collection of 3-D models of different configurations of the object, where the values of the vector represent a confidence or likelihood that a corresponding 3-D model of the collection matches the configuration of the object depicted in the images I. The identified most probable models may all be posed with six degrees of freedom to align with the object depicted in the input images I to find a model minimizing an error or loss function. In some embodiments, the pose estimator 100 generates an average 3-D mesh model based on the average (e.g., mean) of the identified template models (mean shape) and performs a rigid 6-DoF pose estimation of the average 3-D mesh model based on the images I of the object.

In some embodiments of the present disclosure, the pose estimator 100 identifies a 3-D model from the 3-D models of the collection of models in accordance with a probabilistic approach. In more detail, each of the 3-D models in the collection of models may be associated with one or more probabilities, each of the one or more probabilities representing the likelihood of observing the object in the particular configuration associated with the 3-D model, where different probabilities associated with a particular condition may correspond to different contexts of the object (e.g., whether the object is free versus attached to some other component, whether the object is at the top of a pile versus underneath or pressed against other objects, and/or other environmental conditions such as the ambient temperature and/or air pressure). For example, a sealed bag of candies may be observed with a variety of total volumes that follow a Normal distribution around a mean typical (e.g., intended) fill volume, and where the total volume of the bag may vary based on ambient air pressure. The shape of the bag may be more constrained when the fill volume is higher and may be more varied when the fill volume is lower. A lower bound of volume may correspond to approximately the volume of the candies (corresponding to a case where the bag has been punctured), and volumes between this lower bound and a lower end of a typical fill volume may be unlikely to be observed (e.g., because a bag may be unlikely to hold air after it is punctured). For any particular volume of the bag, the possible configurations of the bag may be non-uniformly distributed, where more extreme bending or folding of the bag may be less likely than more median (e.g., flatter) configurations of the bag. Accordingly, in some embodiments of the present disclosure, the pose estimator 100 identifies a 3-D model from the collection based on consistency with the images I of the object, where the consistency is weighted by the probability of observing the particular configuration of the object represented by the 3-D model. Methods for estimating the probability of observing an object in a particular configuration will be described in more detail below with respect to methods for generating collections of 3-D models of objects for a library.

Figure 7:
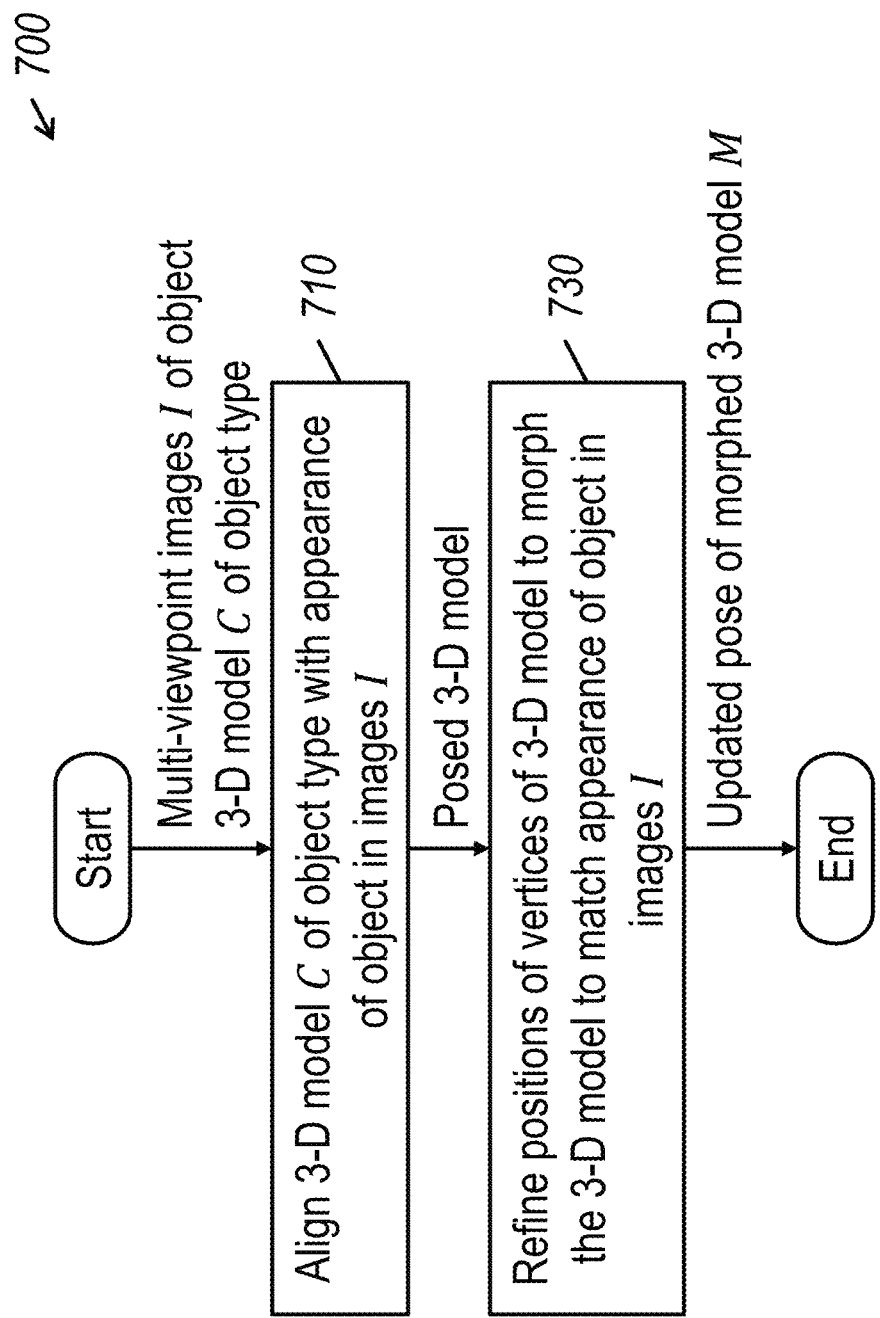
FIG. 7 is a flowchart depicting a method for computing 6-DoF poses of objects based on shape morphing according to some embodiments of the present disclosure.

FIG. 7 is a flowchart depicting a method for computing 6-DoF poses of objects based on shape morphing according to some embodiments of the present disclosure.

In operation 710, the pose estimator 100 estimates the 6-DoF pose of the input 3-D model C to align the 3-D model to the input images I, such as by minimizing a loss function E as described above. In some embodiments, the 3-D model C is a model as identified from a collection of 3-D models of a type of object stored in a library of models in accordance with techniques described above with respect to FIG. 6.

In operation 730, the pose estimator 100 refines the positions of the vertices of the 3-D model (or 3-D mesh model) to morph the 3-D model to more closely match the appearance of the object in the images I (such as by further reducing or minimizing an error metric or loss function E). In some embodiments of the present disclosure, this is performed using a differentiable renderer-based refinement step with the deformation of the 3-D model being optimized to minimize error metric E. In more detail, the use of a differential renderer enables errors computed by the loss function E to be back-propagated through the differentiable 3-D renderer to identify transformations to the underlying 3-D model (e.g., updates to the positions of the vertices of the 3-D model) that would reduce the error, such as by applying gradient descent (see, e.g., Liu, Shichen, et al. "Soft rasterizer: A differentiable renderer for image-based 3d reasoning." *Proceedings of the IEEE/CVF International Conference on Computer Vision.* 2019.).

As noted above, in some embodiments of the present disclosure, the loss function includes components accounting for the error or difference between the surface normals of the object as measured from polarization raw frames captured of the object in the scene by polarization cameras and the rendered surface normals of the 3-D model in its state of deformation and pose. Accordingly, the use of polarization to measure the surface normals of objects in a scene can further improve the accuracy of the 6-DoF pose computed by the pose estimator 100.

Figure 8:
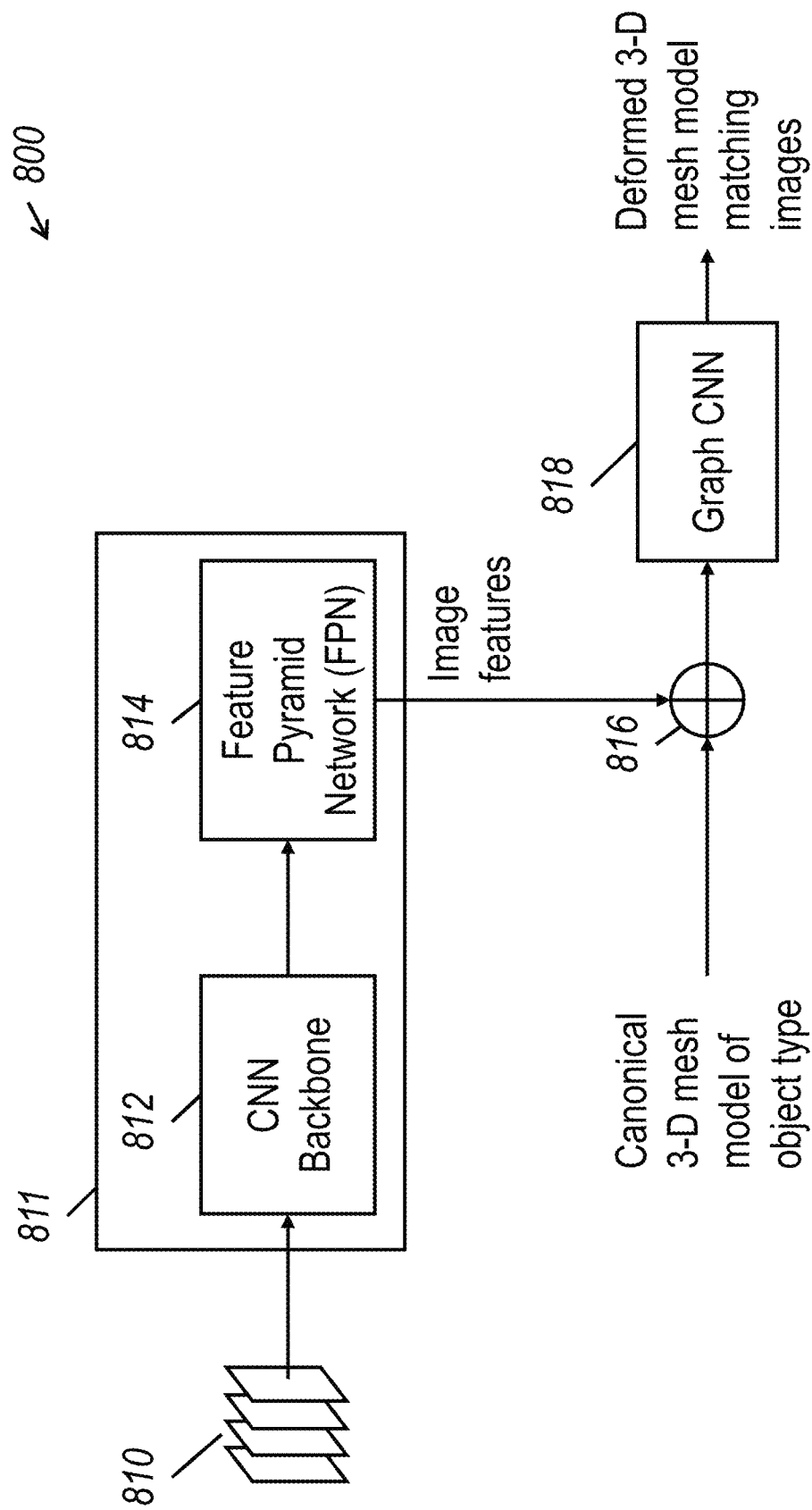
FIG. 8 is a depiction of a neural network architecture configured to transform an input 3-D model to a deformed 3-D model matching or consistent with the images captured of an object according to one embodiment of the present disclosure.

FIG. 8 is a depiction of an architecture of a transformation network 800 configured to transform an input 3-D model (or canonical or representative 3-D model of the object) to a deformed 3-D model matching or consistent with the images captured of an object according to one embodiment of the present disclosure. The deformed 3-D model may differ from the input canonical 3-D model in that the positions of some of the vertices are transformed (e.g., translated within the object coordinate space) such that the configuration or shape of the deformed 3-D mesh model is more consistent with the appearance of the object than the input canonical 3-D mesh model.

As shown in FIG. 8, the pose estimator 100 supplies input images 810 to a feature extraction network 811 to generate a plurality of feature maps. The input images 810 may include images captured by the cameras 10, 30 and/or images generated from those images, such as depth maps (e.g., computed from stereo pairs of images), tenors in polarization representation space such as AOLP and DOLP maps (e.g., computed from polarization raw frames), surface normals maps, and the like.

In the embodiment shown in FIG. 8, the feature extraction network 811 includes a convolutional neural network (CNN) backbone 812, which computes feature maps from the input images 810 and supplies the feature maps to a feature pyramid network (FPN) 814. The CNN backbone 812 may have an architecture such as the CNN backbones used in Mask R-CNN (He, Kaiming, et al. "Mask R-CNN." *Proceedings of the IEEE International Conference on Computer Vision.* 2017.), AlexNet (see, e.g., Krizhevsky, Alex, Ilya Sutskever, and Geoffrey E. Hinton. "ImageNet classification with deep convolutional neural networks." Advances in neural information processing systems. 2012.), VGG (see, e.g., Simonyan, Karen, and Andrew Zisserman. "Very deep convolutional networks for large-scale image recognition." arXiv preprint arXiv:1409.1556 (2014).), ResNet-101 (see, e.g., Kaiming He, Xiangyu Zhang, Shaoqing Ren, and Jian Sun. Deep residual learning for image recognition. In Proceedings of the IEEE Conference on Computer Vision and Pattern Recognition, pages 770-778, 2016.), MobileNet (see, e.g., Howard, Andrew G., et al. "Mobilenets: Efficient convolutional neural networks for mobile vision applications." arXiv preprint arXiv:1704.04861 (2017).), MobileNetV2 (see, e.g., Sandler, Mark, et al. "MobileNetV2: Inverted residuals and linear bottlenecks." Proceedings of the IEEE Conference on Computer Vision and Pattern Recognition. 2018.), and MobileNetV3 (see, e.g., Howard, Andrew, et al. "Searching for MobileNetV3." Proceedings of the IEEE International Conference on Computer Vision. 2019.), although embodiments of the present disclosure are not limited thereto. The feature pyramid network (FPN) 814 (see, e.g., Lin, Tsung-Yi, et al. "Feature pyramid networks for object detection." *Proceedings of the IEEE Conference on Computer Vision and Pattern Recognition.* 2017.) enables the capture of multiscale features in the images (e.g., distinctive features of objects appearing at different sizes within the image), although embodiments of the present disclosure are not limited thereto, and other networks for capturing multiscale features may be used, such as a U-Net (see, e.g., Ronneberger, Olaf, Philipp Fischer, and Thomas Brox. "U-Net: Convolutional networks for biomedical image segmentation." *International Conference on Medical Image Computing and Computer-Assisted Intervention.* Springer, Cham, 2015.).

The image features computed by the feature extraction network 811 are combined (e.g., concatenated) with a representation of the canonical 3-D mesh model at a concatenation node 816, and the model, and the combined image features and the canonical 3-D mesh model are supplied as input to a CAD model to CAD deformed model (CAD2CADD) network 818, such as a graph convolutional neural network, to generate a deformed 3-D mesh model. In some embodiments, the CAD2CADD network 818 includes multiscale skip connections to preserve detail at different spatial frequencies.

Some aspects of embodiments of the present disclosure relate to performing end-to-end training of the transformation network 800 for transforming a canonical 3-D mesh model to a deformed 3-D mesh model, where the deformed 3-D mesh model matches or is consistent with the shape of the object depicted in the input images 810. In some embodiments, a separate transformation network 800 is trained for each type of object expected to be observed by the pose estimator 100 (e.g., separate networks for each different type of flexible printed circuit board, other components, and workpieces in a pose estimator 100 configured in an electronics manufacturing context, or separate networks for each different type of bag of candy and for each different type of box that the bags of candies will be packed into, in the case of a pose estimator 100 supporting a food packing robotic system).

The transformation network 800 may be trained based on labeled training data, where the training data includes a particular input 3-D mesh model and sets of input images along with their corresponding ground truth deformed 3-D mesh model. The training set may include a large number of different deformed 3-D mesh models representing different configurations of the object, along with input images depicting an object in the particular configuration. Systems and methods for generating training data will be described in more detail below.

To perform end-to-end training, sets of training images and training initial or canonical 3-D mesh models are supplied to the transformation network 800 to compute output deformed 3-D mesh models. The output deformed 3-D mesh models are then compared against the ground truth training deformed 3-D mesh models to compute an error in accordance with a loss function. The errors are used to update the parameters of the transformation network 800 (e.g., the weights of connections within the various neural networks, such as the feature extraction network 811, which may include a CNN backbone 812 and a feature pyramid network 814, and the CAD2CADD network 818) in accordance with a backpropagation algorithm.

In some embodiments, the loss function used to compute the error uses a chamfer distance (see, e.g., Kurenkov, Andrey, et al. "Deformnet: Free-form Deformation Network for 3D Shape Reconstruction from a Single Image." 2018 *IEEE Winter Conference on Applications of Computer Vision (WACV)*. IEEE, 2018., the entire disclosure of which is incorporated by reference herein). In addition, in some embodiments, regularization is applied to the activations and/or outputs of the transformation network 800, including regularization of the surface normals, requiring smoothness on the output deformed 3-D mesh model (e.g., disfavoring or smoothing out irregular or extreme deformations in the output model), and functional smoothness (e.g., ensuring that the CAD2CADD network 818 applies equal motion).

In some embodiments, the process of training the transformation network 800 includes the retraining of the feature extraction network 811 to output features that are more closely linked to vertices/edges. For example, a pre-trained CNN backbone 812 and pre-trained feature pyramid network 814 may be used at the start of the training process, and, after performing training of the entire transformation network 800, the feature extraction network 811 computes image features relate more closely to detecting features related to the vertices and edges of objects depicted in the input images 810. In some embodiments, the feature extraction network 811 is trained to detect these features that are more closely related to vertices and edges in a process that is separate from (e.g., performed before) the end-to-end training of the transformation network 800 as a whole. For example, the feature extraction network 811 may be trained using training data that includes input images and desired output feature maps in which the vertices and edges of the object are labeled.

Figure 9:
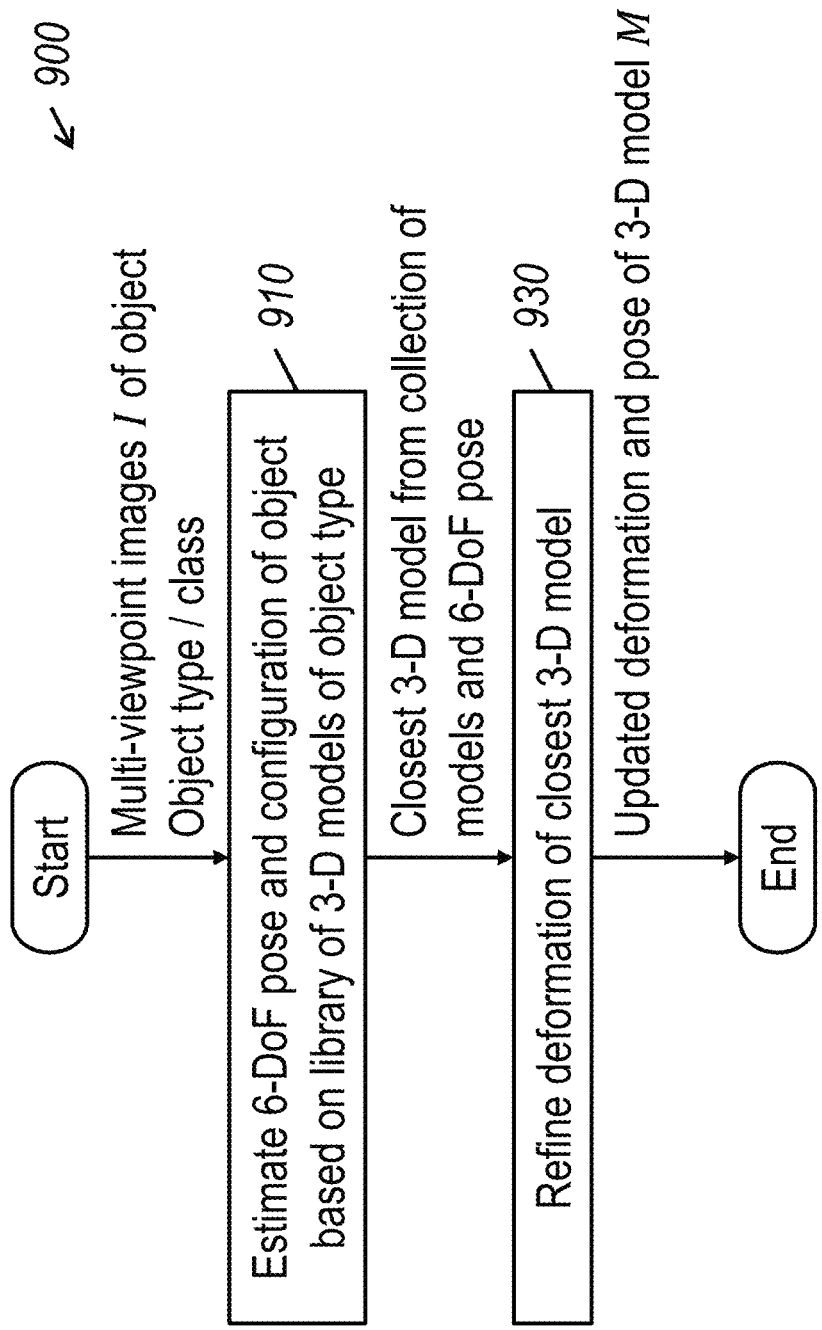
FIG. 9 is a flowchart depicting a method for computing 6-DoF poses of objects based on a library of models of objects and shape morphing according to some embodiments of the present disclosure.

FIG. 9 is a flowchart depicting a method for computing 6-DoF poses of objects based on a library of models of objects and shape morphing according to some embodiments of the present disclosure. The method 900 shown in FIG. 9 may be used to perform operations 350 and 370 of method 300 as shown in FIG. 3. As shown in FIG. 9, in operation 910 the pose estimator 100 may use images I of an object and the object type or class to identify a closest or most similar 3-D model from a library of models and a 6-DoF pose of the identified 3-D model that maximizes or optimizes a consistency between the posed identified 3-D model and the object depicted in the images. Operation 910 may be performed using techniques corresponding to those described above with respect to method 600 and depicted in FIG. 6. In operation 930, the pose estimator 100 refines the shape of the 3-D model identified in operation 910, such as by further deforming the mesh (e.g., modifying the positions of the vertices of the mesh) to more closely match the appearance of the object in the input images I. Operation 930 may be performed using techniques corresponding to those described above with respect to method 700 and depicted in FIG. 7.

In some circumstances, some parts of an object may have sufficient texture for determining a shape based on uv correspondence mapping (e.g. in accordance with FIG. 5), while other portions of the same object lack sufficient texture for doing so. Accordingly, some aspects of embodiments of the present disclosure relate to applying different techniques for computing or estimating the shapes of different parts of the same object.

Figure 10:
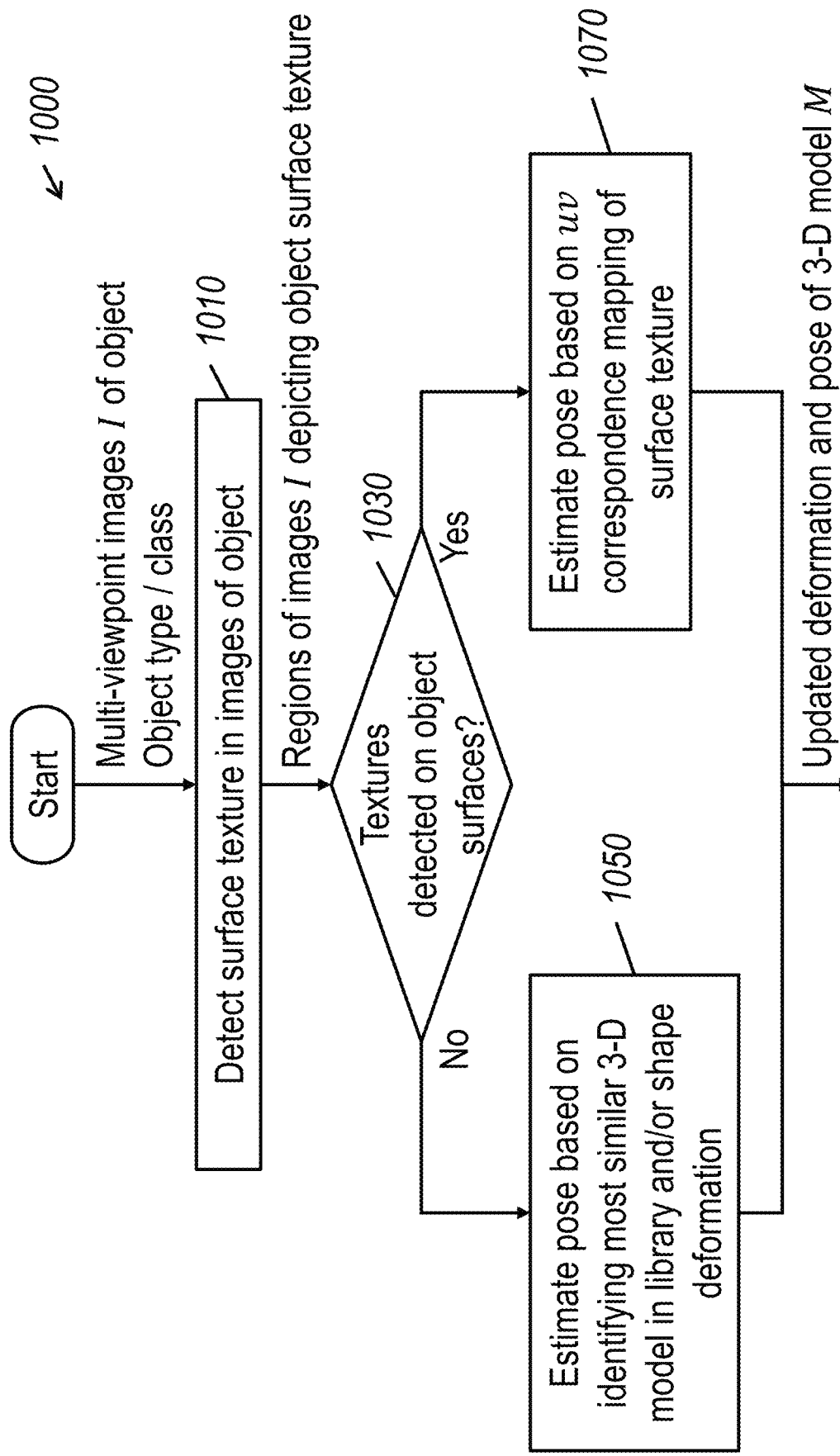
FIG. 10 is a flowchart depicting a method for selecting a technique for estimating a pose of an object based on whether surface texture is visible in the surfaces of the object as depicted in the input images I of the object according to one embodiment of the present disclosure.

FIG. 10 is a flowchart depicting a method 1000 for selecting a technique for estimating a pose of an object based on whether surface texture is visible in the surfaces of the object as depicted in the input images I of the object according to one embodiment of the present disclosure. The method 1000 shown in FIG. 10 may be used to perform operations 350 and 370 of method 300 as shown in FIG. 3. In operation 1010, the pose estimator 100 detects surface texture in the surfaces of the object depicted in the images I of the object. This may include identifying the regions of the images that include texture (e.g., by detecting the presence of edges, gradients, or keypoints within the regions of the images I identified through instance segmentation in operation 330 as belonging to the object). In operation 1030, the pose estimator 100 determines if surface textures were detected in the surfaces of the object (e.g., whether substantially all of the surfaces of the object depicted in the images I have surface texture). If not, then the pose estimator 100 proceeds, in operation 1050, with estimating the pose of the object based on identifying a most similar 3-D model from the library and/or performing shape deformation, as described above with respect to, for example, method 600 of FIG. 6, method 700 of FIG. 7, and method 900 of FIG. 9. If surface texture is detected, then the pose estimator 100 proceeds, in operation 1070, with estimating the pose of the object based on uv correspondence mapping of surface textures with respect to, for example, method 500 of FIG. 5.

Generating a Library of 3-D Models of Objects

In some embodiments of the present disclosure, a library of 3-D models of objects includes representations of all types of objects expected to be encountered by the pose estimator 100 in its operation. For example, a pose estimator

100 providing 6-DoF poses of objects to the controller 28 of a robotic arm 24 may store or otherwise have access to a library of 3-D models of objects that will be encountered by the robotic arm 24 in its operating environment (e.g., the workpieces and components encountered by a robotic arm used in a particular manufacturing context).

In some embodiments, a library includes one or more models for each of the types or classes of object for which the pose estimator 100 is configured to estimate 6-DoF poses. For example, in the case of a particular flexible printed circuit board, the library may include a collection of 3-D models of the flexible printed circuit board in various configurations (e.g., various degrees of bending and/or twisting of the shape of the flexible printed circuit board). As another example, in the case of a bag of candies, the collection of 3-D models may include different configurations of the bag due to the distributions of candies within the bag and/or different folding, wrinkling, and/or puckering of surfaces of the bag. For the sake of generality, in some embodiments, the same pose estimator 100 is used to estimate the poses both of deformable objects and rigid objects. Accordingly, in some embodiments, a single 3-D model may be sufficient to represent a rigid object. In addition, as discussed above, in some embodiments of the present disclosure, a single deformable mesh model (or 3-D model) is used to represent a type or class of object, and the deformable mesh model is deformed to match the appearance of the instance of the object depicted in the images I. Furthermore, in some embodiments, the 3-D models in the library may be associated with surface textures (e.g., 2-D images) that are mapped onto the surfaces of the 3-D model, and these surface textures are used to estimate the shape and/or pose of the objects depicted in the images I, based on detecting the locations of correspondences (e.g., keypoints) in the images I. In some embodiments, these different techniques may be combined, such as where a type or class of object is associated with multiple 3-D models and a corresponding surface texture for those multiple models, and where those multiple models may be deformable 3-D mesh models.

Figure 11:
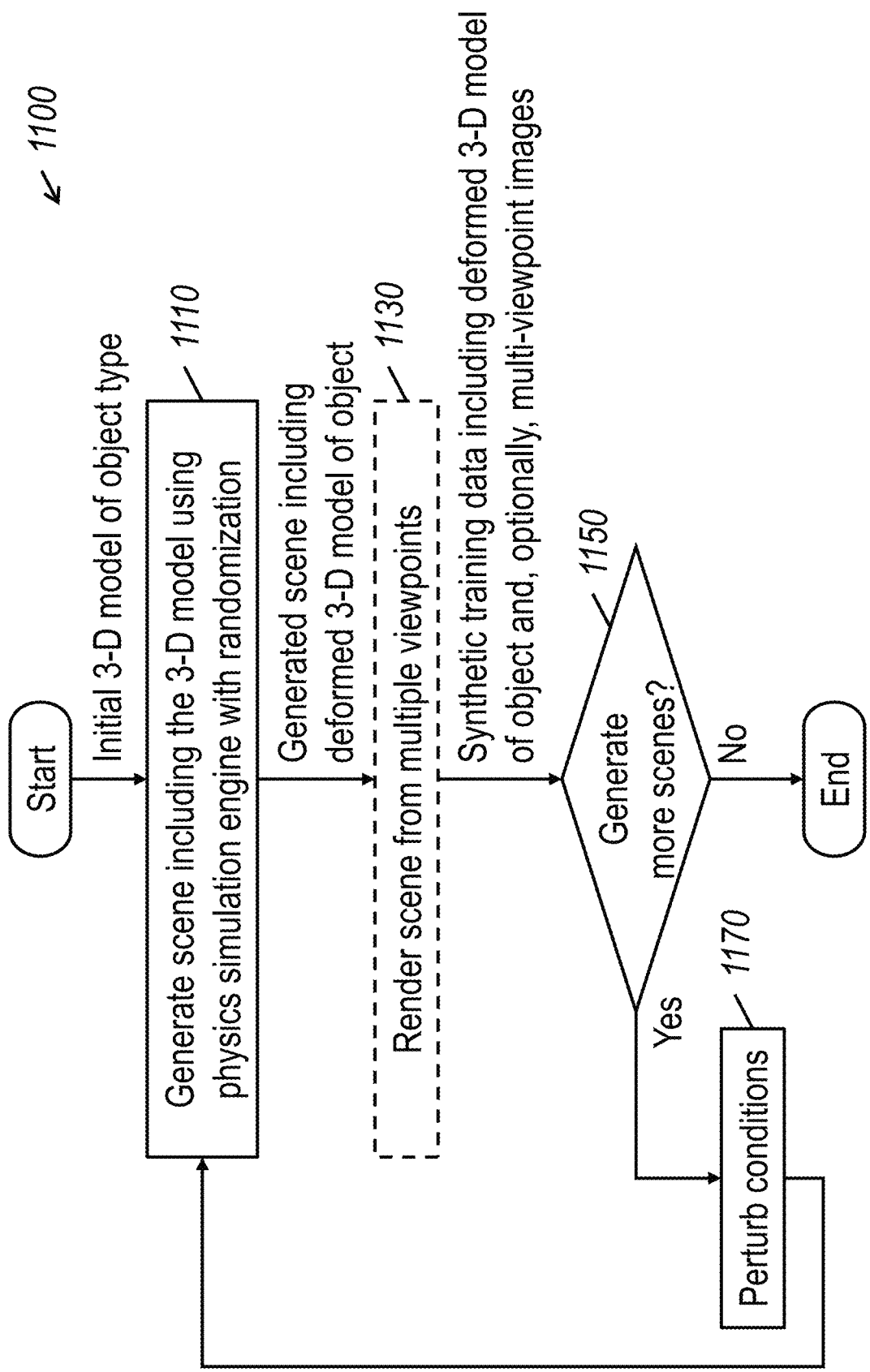
FIG. 11 is a flowchart depicting a method for generating a collection of 3-D models of a type or class of object for a library of 3-D models of objects according to one embodiment of the present disclosure.

FIG. 11 is a flowchart depicting a method for generating a collection of 3-D models of a type or class of object for a library of 3-D models of objects according to one embodiment of the present disclosure. In some embodiments of the present disclosure, a synthetic data generator is used to generate collections of 3-D models representing a deformable object in different physical configurations. The synthetic data generator may include a processor and a memory storing instructions that, when executed by the processor, cause the processor to perform operations for generating the collection of 3-D models. Generated collections of models may be stored in a library, and some or all of the 3-D models stored in the library may be provided or otherwise made accessible to the pose estimator 100, such as being stored in a mass storage device or other memory of the pose estimator 100 or stored remotely from the pose estimator and accessed over a network connection.

In the embodiment shown in FIG. 11, the synthetic data generator receives an initial 3-D model of the object type (e.g., a particular bag of candies or a particular flexible printed circuit). The 3-D model may be a 3-D mesh model, which includes a plurality of vertices (e.g., 3-D points in object-level or model-level coordinate space) and edges defining surfaces of the 3-D model. The vertices and edges may be associated with various material properties, such as whether vertices are deformably connected (e.g., in the case of two vertices corresponding to flexible portions of a flexible printed circuit board) or rigidly connected (e.g., in the case of two vertices corresponding to a part of a rigid connector mounted on the flexible printed circuit board). The 3-D model may also store information regarding the physical properties of various portions of the 3-D model, such as spring constants of spring-like portions of objects, tensile strength, elasticity, and the like.

In operation 1110 of method 1100, the synthetic data generator generates a scene including the supplied initial 3-D model using a physics simulation engine, such as a physics engine incorporated into a 3-D computer graphics rendering system. For example, the Blender® 3-D rendering software includes a physics system that simulates various physical real-world phenomena such as the movement, collision, and potential deformation of rigid bodies, cloth, soft bodies, fluids, and the like, as affected by gravity or other forces. Accordingly, a rigid body simulation may be used for simulating the dropping of rigid components (e.g., screws, bolts, relatively stiff springs) into a rigid virtual bin, and a soft body simulation may be used for elastic or deformable components (e.g., string, wire, plastic sheeting, etc.). The synthetic data generator applies randomization or perturbation to the scene, in which the conditions of scene are modified in order to generate different scenes where the 3-D model of the object type may be perturbed into different configurations when generating multiple scenes.

The virtual scene may include other objects that may be used to simulate the conditions under which the objects may typically be observed in an operating environment of the pose estimator system 100. For example, if the object is typically be observed supported on a flat surface (e.g., a work bench or a conveyor belt), then different the 3-D model of the object may be rotated to random orientations and dropped onto a flat surface in the physics simulator many times (e.g., thousands of times) to generate a library of possible 3-D deformations of the object. As another example, if the object is typically jumbled in a bin with other objects (of the same type or of different types), then synthetic data generator may be configured to construct a scene including a virtual bin and to jumble the 3-D model of the object with other objects to generate scenes with the object deformed due to physical interactions with the other objects and/or sides of the bin. As a third example, some objects may be connected to other objects (e.g., workpieces in various states of assembly in a manufacturing facility), and therefore the synthetic data generator may be configured to simulate the shape of the deformable object by connecting the 3-D model of the object type to physical models of the workpieces and simulating the interactions between the deformable object and its environment.

Generating a large number of potential deformations of the 3-D model representing the object type thereby generates a collection of 3-D models of different configurations of the same object type, where the possible configurations are constrained based on the modeled physical characteristics of the object, as simulated by the physics simulator. These generated 3-D models can then be added to the library in association with the object type and retrieved for estimating the 6-DoF poses of objects.

In some embodiments, in operation 1130 the synthetic data generator also renders images of the randomly generated scene from multiple viewpoints (e.g., through ray tracing or rasterization). In some embodiments, only the object of interest is rendered, excluding other objects in the scene. In some embodiments, all of the objects in the scene visible to the virtual camera are rendered, and in some embodiments the field of view of the rendering is narrowed to depict only a patch corresponding to the object of interest. This process of rendering images may include placing a virtual camera at one or more poses with respect to the scene and rendering a 2-D image of the scene from those virtual viewpoints. In addition to rendering visible light images (e.g., color images), a synthetic data generator may also render images in other imaging spectra such as infrared and ultraviolet light, and using other imaging modalities such as polarization. Systems and methods for synthetic data generation are described in more detail in International Patent Application No. PCT/US21/12073 "SYSTEMS AND METHODS FOR SYNTHESIZING DATA FOR TRAINING STATISTICAL MODELS ON DIFFERENT IMAGING MODALITIES INCLUDING POLARIZED IMAGES," filed in the United States Patent and Trademark Office on Jan. 4, 2021, the entire disclosure of which is incorporated by reference herein. The renderings of the scene may be used as part of the training data for training machine learning models, such as for training the transformation network 800 described above with respect to FIG. 8. In more detail, the deformed 3-D model of the object of the current generated scene is paired with the collection of renderings of the current generated scene to produce a training sample.

In operation 1150, the synthetic data generator determines whether to generate more scenes, such as based on whether a designated number of 3-D model configurations has been generated or based on a distribution of observed models across a theoretical range of possible models. If more scenes are to be generated, then the synthetic data generator proceeds with perturbing the conditions of the simulation in operation 1170, such as by jumbling a virtual bin containing the object, dropping the object onto a surface, shaking an object, or the like, and returning to operation 1110 to generate a new scene based on the modified conditions. In the new scene, the 3-D model may be deformed in a different manner than in the previously generated scene or scenes, and the corresponding renderings, if any, may also appear different, thereby generating another training sample. Repeating the process generates a plurality of training samples, which may be used to train machine learning models.

In some embodiments, training data is generated by performing physical manipulations of real-world instances of objects. In particular, a physical object may be placed into a physical scene and imaged by a collection of cameras (e.g., similar to the master camera 10 and support cameras 30). In addition, a 3-D scanning system may be used to capture a 3-D model of the object within the scene (e.g., a plurality of stereo depth camera systems, time of flight depth camera systems, and/or the like). Perturbations of these scenes may be performed using, for example, a physical agitator to agitate a bin or other container of objects or by using a robot arm to mix or otherwise deform the object or objects in the scene into new configurations. In some embodiments, a robot is trained to perform manipulations of the object to explore the space of possible configurations (e.g., to perturb the object into configurations that the robot has not yet observed). See, e.g., Nair, Ashvin, et al. "Combining self-supervised learning and imitation for vision-based rope manipulation." 2017 *IEEE international conference on robotics and automation (ICRA)*. IEEE, 2017. As a result, the 3-D scanning of real physical objects deformed in a variety of different ways produces a collection of captured 3-D models of the object in a plurality of different configurations.

While the above techniques for generating synthetic data relate to generating high resolution 3-D mesh models, embodiments of the present disclosure are not limited thereto. In some embodiments, the process of generating data for a library and/or for training data for training machine learning models involves generating imaging approximations (e.g. sparse stereo/geometry) instead of generating high resolution or full resolution 3-D mesh models.

In some circumstances, the randomly generated 3-D physical configurations of the object (whether generated by the synthetic data generator or by the physical manipulation of real-life objects) are binned or clustered in accordance with similarity (e.g., based on how close the corresponding vertices are to one another between 3-D models representing different configurations), and a representative 3-D model is selected or computed (e.g., through computing a mean 3-D model) from the clustered set of 3-D models. In some circumstances, the 3-D models will be distributed non-uniformly between the different clusters, and therefore a probability distribution may be estimated based on the populations of the cluster. These probabilities may also be stored with the 3-D model and may be used when identifying a most likely matching model in the process of pose estimation.

Accordingly, aspects of embodiments of the present disclosure relate to systems and methods for performing six degree of freedom pose estimation for deformable objects, including computing an estimated configuration of the deformable object, as represented by a 3-D model of the object, and a pose of the 3-D model of the object that represents the estimated pose of the object observed in a scene by a plurality of cameras at different viewpoints. Some aspects of embodiments of the present disclosure also relate to systems and methods for generating training data for training machine learning models that operate as part of a processing pipeline for computing the estimates of the 6-DoF poses of deformable objects.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A computer-implemented method for computing a pose of a deformable object, the method comprising:
 receiving a plurality of images depicting the deformable object from multiple viewpoints;
 computing a class of the deformable object depicted in the images;
 loading a 3-D model corresponding to the class of the deformable object;
 aligning the 3-D model to the deformable object depicted in the plurality of images to compute a pose of the deformable object, including:
  refining a plurality of vertex positions of a plurality of vertices of the 3-D model to match appearances of the deformable object in the images captured from the multiple viewpoints,
  wherein refining the plurality of vertex positions is performed using a loss function E comprising a first component $E_1$ and a second component $E_2$,
  wherein $E_1$ represents pixel-level differences between an appearance of the deformable object in the images and an appearance of the deformable object in renderings of the 3-D model from viewpoints corresponding to the images, and wherein $E_2$ represents a degree of alignment of a silhouette of the deformable object in the images and a silhouette of the deformable object in the renderings of the 3-D model from the viewpoints corresponding to the images; and outputting the pose of the deformable object.

2. The method of claim 1, wherein loading the 3-D model comprises loading the 3-D model from a library comprising 3-D models of a plurality of different classes of objects.

3. The method of claim 1, wherein the 3-D model comprises data representing a surface texture, and Wherein aligning the 3-D model comprises:
computing a plurality of uv correspondence maps between the surface texture of the 3-D model and corresponding ones of the plurality of images;
matching correspondences between the images and locations in 3-D coordinate space to compute an initial deformation and pose of the 3-D model; and
updating a plurality of locations of a plurality of vertices of the 3-D model to deform the 3-D model to match the images of the deformable object.

4. The method of claim 3, wherein computing the uv correspondence maps comprises supplying the images to a trained neural network.

5. The method of claim 3, wherein computing the uv correspondence maps comprises supplying the images to a keypoint detector and detecting corresponding locations of keypoints in the images and in the surface texture of the 3-D model.

6. The method of claim 3, wherein updating the locations of the vertices is subject to physical constraints on the vertices, the physical constraints being specified in the 3-D model.

7. The method of claim 1, wherein loading the 3-D model comprises:
loading the 3-D model from a library of 3-D models comprising a collection of 3-D models corresponding to the class of the deformable object, the 3-D models of the collection representing different physical configurations of an object of the class; and
selecting the 3-D model based on a closest matching model from the collection of 3-D models of corresponding to the class.

8. The method of claim 7, wherein the collection of 3-D models comprises a plurality of synthesized 3-D models generated from an initial 3-D model corresponding to the class of the deformable object in one configuration by:
generating a first scene including the initial 3-D model deformed into a first deformed 3-D model in accordance with a physics simulation engine under a plurality of simulation conditions;
perturbing the simulation conditions to produce a plurality of perturbed simulation conditions; and
rendering a second scene including the initial 3-D model deformed into a second deformed 3-D model in accordance with the physics simulation engine under the perturbed simulation conditions.

9. The method of claim 7, wherein the collection of 3-D models comprises a plurality of captured 3-D models of a physical object of the class of the deformable object, the captured 3-D models corresponding to captures of the physical object deformed into a plurality of configurations.

10. The method of claim 1, wherein the renderings are generated from the 3-D model by a pipeline comprising a differentiable renderer, and wherein the plurality of vertex positions are updated by backpropagating errors computed by the loss function E through the pipeline comprising the differentiable renderer.

11. The method of claim 1, wherein refining the plurality of vertex positions of the plurality of vertices is performed by a transformation neural network trained to compute a deformed 3-D model based on an input canonical 3-D model and the images of the deformable object, the transformation neural network comprising:
a feature extraction network trained to extract multiscale features from the images; and
a graph convolutional neural network trained to generate the deformed 3-D model from the multiscale features and the input canonical 3-D model.

12. The method of claim 11, wherein the transformation neural network is trained based on training data comprising a plurality of training samples, each of the training samples comprising a 3-D model deformed in accordance with a generated scene and multi-view renderings of the 3-D model corresponding to images rendered from different virtual viewpoints.

13. The method of claim 1, wherein the first component $E_1$ of the loss function E is:

$$E_1 = \sum_{n=1}^{N} \|R_n(M) - I_n\|_2$$

where $I_n$ is an image from viewpoint n among N viewpoints, $R_n(M)$ is a rendering of the 3-D model M from viewpoint n, and the 3-D model M is a function of translation and rotation parameters of a current pose of the deformable object.

14. The method of claim 1, wherein the first component $E_1$ of the loss function E comprises differences between rendered surface normals of the 3-D model and images corresponding to surface normals maps of surfaces.

15. The method of claim 14, wherein the surface normals maps are computed from polarization raw frames.

16. The method of claim 1, wherein the second component $E_2$ of the loss function E is:

$$E_2 = \sum_{n=1}^{N} 1 - \|S_{pn} \otimes S_n\|_1 / \|S_{pn} \oplus S_n - S_{pn} \otimes S_n\|_1$$

wherein $S_{pn}$ is the silhouette of the 3-D model as it appears in a rendering from an n-th viewpoint $R_n(M)$ and $S_n$ is the silhouette of the deformable object as it appears in an image $I_n$ from the n-th viewpoint, wherein the $\otimes$ operator is a pixel-wise product operator, and wherein the $\oplus$ operator is a pixel-wise addition operator.

17. The method of claim 1, wherein the images comprise polarization raw frames.

18. A system for computing a pose of a deformable object, the system comprising:
a camera system configured to capture images of a scene from multiple viewpoints;
one or more computers and one or more storage devices storing instructions that are operable, when executed by the one or more computers, to cause the one or more computers to perform operations comprising:

receiving a plurality of images depicting the deformable object from multiple viewpoints;

computing a class of the deformable object depicted in the images;

loading a 3-D model corresponding to the class of the deformable object;

aligning the 3-D model to the deformable object depicted in the plurality of images to compute a pose of the deformable object, including:

refining a plurality of vertex positions of a plurality of vertices of the 3-D model to match appearances of the deformable object in the images captured from the multiple viewpoints, wherein refining the plurality of vertex positions is performed using a loss function E comprising a first component $E_1$ and a second component $E_2$, wherein $E_1$ represents pixel-level differences between an appearance of the deformable object in the images and an appearance of the deformable object in renderings of the 3-D model from viewpoints corresponding to the images, and wherein $E_2$ represents a degree of alignment of a silhouette of the deformable object in the images and a silhouette of the deformable object in the renderings of the 3-D model from the viewpoints corresponding to the images; and outputting the pose of the deformable object.

19. The system of claim 18, wherein loading the 3-D model comprises loading the 3-D model from a library comprising 3-D models of a plurality of different classes of objects.

20. The system of claim 18, wherein the 3-D model comprises a surface texture, and wherein aligning the 3-D model comprises:

computing a plurality of uv correspondence maps between the surface texture of the 3-D model and corresponding ones of the plurality of images;

matching correspondences between the images and locations in 3-D coordinate space to compute an initial deformation and pose of the 3-D model; and updating a plurality of locations of a plurality of vertices of the 3-D model to deform the 3-D model to match the images of the deformable object.

21. The system of claim 20, wherein computing the uv correspondence maps comprises supplying the images to a trained neural network.

22. The system of claim 20, wherein computing the uv correspondence maps comprises supplying the images to a keypoint detector and to detecting corresponding locations of keypoints in the images and in the surface texture of the 3-D model.

23. The system of claim 20, wherein updating the locations of the vertices comprises subjecting the update to physical constraints on the vertices, the physical constraints being specified in the 3-D model.

24. The system of claim 18, wherein loading the 3-D model comprises:

loading the 3-D model from a library of 3-D models comprising a collection of 3-D models corresponding to the class of the deformable object, the 3-D models of the collection representing different physical configurations of an object of the class; and selecting the 3-D model based on a closest matching model from the collection of 3-D models of corresponding to the class.

25. The system of claim 24, wherein the collection of 3-D models comprises a plurality of synthesized 3-D modes generated from an initial 3-D model corresponding to the class of the deformable object in one configuration by:

generating a first scene including the initial 3-D model deformed into a first deformed 3-D model in accordance with a physics simulation engine under a plurality of simulation conditions;

perturbing the simulation conditions to produce a plurality of perturbed simulation conditions; and rendering a second scene including the initial 3-D model deformed into a second deformed 3-D model in accordance with the physics simulation engine under the perturbed simulation conditions.

26. The system of claim 24, wherein the collection of 3-D models comprises a plurality of captured 3-D models of a physical object of the class of the deformable object, the captured 3-D models corresponding to captures of the physical object deformed into a plurality of configurations.

27. The system of claim 18, wherein the renderings are generated from the 3-D model by a pipeline comprising a differentiable renderer, and wherein the plurality of vertex positions are updated by backpropagating errors computed by the loss function E through the pipeline comprising the differentiable renderer.

28. The system of claim 18, wherein refining the plurality of vertex positions of the plurality of vertices comprises performing the refinement by a transformation neural network trained to compute a deformed 3-D model based on an input canonical 3-D model and the images of the deformable object, the transformation neural network comprising:

a feature extraction network trained to extract multiscale features from the images; and a graph convolutional neural network trained to generate the deformed 3-D model from the multiscale features and the input canonical 3-D model.

29. The system of claim 28, wherein the operations further comprise training the transformation neural network based on training data comprising a plurality of training samples, each of the training samples comprising a 3-D model deformed in accordance with a generated scene and multi-view renderings of the 3-D model corresponding to images rendered from different virtual viewpoints.

30. The system of claim 18, wherein the first component $E_1$ of the loss function E is:

$$E_1 = \sum_{n=1}^{N} \|R_n(M) - I_n\|_2$$

where $I_n$ is an image from viewpoint n among N viewpoints, $R_n(M)$ is a rendering of the 3-D model M from viewpoint n, and the 3-D model M is a function of translation and rotation parameters of a current pose of the deformable object.

31. The system of claim 18, wherein the first component $E_1$ of the loss function E comprises differences between rendered surface normals of the 3-D model and images corresponding to surface normals maps of surfaces.

32. The system of claim 31, wherein the operations further comprise computing surface normals maps from polarization raw frames.

33. The system of claim 18, wherein the second component $E_2$ of the loss function E is:

$$E_2 = \sum_{n=1}^{N} 1 - \|S_{pn} \otimes S_n\|_1 / \|S_{pn} \oplus S_n - S_{pn} \otimes S_n\|_1$$

wherein $S_{pn}$ is the silhouette of the 3-D model as it appears in a rendering from an n-th viewpoint $R_n(M)$ and $S_n$ is the silhouette of the object as it appears in an image $I_n$ from the n-th viewpoint, wherein the $\otimes$ operator is a pixel-wise product operator, and wherein the $\oplus$ operator is a pixel-wise addition operator.

34. The system of claim 18, wherein the images comprise polarization raw frames.

35. One or more non-transitory computer storage media encoded with computer program instructions that when executed by one or more computers cause the one or more computers to perform operations to compute a pose of a deformable object, the operations comprising:
  receiving a plurality of images depicting the deformable object from multiple viewpoints;
  computing a class of the deformable object depicted in the images;
  loading a 3-D model corresponding to the class of the deformable object;
  aligning the 3-D model to the deformable object depicted in the plurality of images to compute a pose of the deformable object, including:
    refining a plurality of vertex positions of a plurality of vertices of the 3-D model to match appearances of the deformable object in the images captured from the multiple viewpoints,
    wherein refining the plurality of vertex positions is performed using a loss function E comprising a first component $E_1$ and a second component $E_2$,
    wherein $E_1$ represents pixel-level differences between an appearance of the deformable object in the images and an appearance of the deformable object in renderings of the 3-D model from viewpoints corresponding to the images, and
    wherein $E_2$ represents a degree of alignment of a silhouette of the deformable object in the images and a silhouette of the deformable object in the renderings of the 3-D model from the viewpoints corresponding to the images; and
  outputting the pose of the deformable object.

36. The one or more computer storage media of claim 35, wherein loading the 3-D model comprises loading the 3-D model from a library comprising 3-D models of a plurality of different classes of objects.

37. The one or more computer storage media of claim 35, wherein the 3-D model comprises data representing a surface texture, and
  wherein aligning the 3-D model comprises:
    computing a plurality of uv correspondence maps between the surface texture of the 3-D model and corresponding ones of the plurality of images;
    matching correspondences between the images and locations in 3-D coordinate space to compute an initial deformation and pose of the 3-D model; and
    updating a plurality of locations of a plurality of vertices of the 3-D model to deform the 3-D model to match the images of the deformable object.

38. The one or more computer storage media of claim 37, wherein computing the uv correspondence maps comprises supplying the images to a trained neural network.

39. The one or more computer storage media of claim 37, wherein computing the uv correspondence maps comprises supplying the images to a keypoint detector and detecting corresponding locations of keypoints in the images and in the surface texture of the 3-D model.

40. The one or more computer storage media of claim 37, wherein updating the locations of the vertices is subject to physical constraints on the vertices, the physical constraints being specified in the 3-D model.

41. The one or more computer storage media of claim 35, wherein loading the 3-D model comprises:
  loading the 3-D model from a library of 3-D models comprising a collection of 3-D models corresponding to the class of the deformable object, the 3-D models of the collection representing different physical configurations of an object of the class; and
  selecting the 3-D model based on a closest matching model from the collection of 3-D models of corresponding to the class.

42. The one or more computer storage media of claim 41, wherein the collection of 3-D models comprises a plurality of synthesized 3-D models generated from an initial 3-D model corresponding to the class of the deformable object in one configuration by:
  generating a first scene including the initial 3-D model deformed into a first deformed 3-D model in accordance with a physics simulation engine under a plurality of simulation conditions;
  perturbing the simulation conditions to produce a plurality of perturbed simulation conditions; and
  rendering a second scene including the initial 3-D model deformed into a second deformed 3-D model in accordance with the physics simulation engine under the perturbed simulation conditions.

* * * * *